United States Patent
Boo

(10) Patent No.: US 10,360,002 B2
(45) Date of Patent: Jul. 23, 2019

(54) METHOD, APPARATUS, AND COMPUTER-READABLE MEDIUM FOR GENERATING AN ALTERNATIVE IMPLEMENTATION OF A PROGRAM ON ONE OR MORE ENGINES

(71) Applicant: Informatica LLC, Redwood City, CA (US)

(72) Inventor: Guy Ryan Boo, Sheung Wan (HK)

(73) Assignee: Informatica LLC, Redwood City, CA (US)

( * ) Notice: Subject to any disclaimer, the term of this patent is extended or adjusted under 35 U.S.C. 154(b) by 0 days.

(21) Appl. No.: 15/615,264

(22) Filed: Jun. 6, 2017

(65) Prior Publication Data

US 2018/0349113 A1 Dec. 6, 2018

(51) Int. Cl.
*G06F 9/44* (2018.01)
*G06F 8/40* (2018.01)

(52) U.S. Cl.
CPC ................... *G06F 8/40* (2013.01)

(58) Field of Classification Search
CPC ............... G06F 8/40; G06F 8/41; G06F 8/42
USPC ................... 717/136–141, 144, 156–157
See application file for complete search history.

(56) References Cited

U.S. PATENT DOCUMENTS

| | | | | |
|---|---|---|---|---|
| 6,981,249 | B1 * | 12/2005 | Knoblock | G06F 8/73 717/141 |
| 7,152,228 | B2 * | 12/2006 | Goodwin | G06F 8/10 717/146 |
| 7,165,239 | B2 * | 1/2007 | Hejlsberg | G06F 9/4488 717/114 |
| 7,409,378 | B2 * | 8/2008 | Castellani | G06Q 50/188 706/62 |
| 7,454,400 | B2 * | 11/2008 | Andreoli | G06Q 10/10 706/62 |
| 8,166,465 | B2 * | 4/2012 | Feblowitz | H04L 65/60 709/201 |

(Continued)

OTHER PUBLICATIONS

Rahman et al, "Reverse Engineering Molecular Hypergraphs", IEEE/ACM Transactions on Computational Biology and Bioinformatics, vol. 10, No. 5, pp. 1113-1124, 2013.*

(Continued)

*Primary Examiner* — Anil Khatri
(74) *Attorney, Agent, or Firm* — Amardeep S. Grewal; Reed Smith LLP

(57) ABSTRACT

An apparatus, apparatus and computer-readable medium for generating an alternative implementation of a program on one or more engines, including receiving a job graph comprising a sequence of jobs corresponding to the program, translating each job into a set of candidate translations corresponding to that job based on one or more available engines, storing each set of candidate translations corresponding to each job in the job graph in a region of a job hypergraph, condensing the job hypergraph into an alternative job graph by iteratively replacing each pair of connected regions with a merged region comprising a merged candidate translation generated by combining a pair of candidate translations in that pair of connected regions, and generating the alternative implementation of the program based at least in part on the alternative job graph.

33 Claims, 29 Drawing Sheets

(56) References Cited

U.S. PATENT DOCUMENTS

| | | | | |
|---|---|---|---|---|
| 8,239,847 | B2* | 8/2012 | Yu | G06F 8/456 |
| | | | | 712/200 |
| 8,327,304 | B2* | 12/2012 | Moffitt | G06F 17/5027 |
| | | | | 716/106 |
| 8,359,586 | B1* | 1/2013 | Orofino, II | G06F 8/443 |
| | | | | 717/140 |
| 8,516,454 | B2* | 8/2013 | Mizrachi | G06F 8/4442 |
| | | | | 717/140 |
| 9,727,604 | B2* | 8/2017 | Jin | G06F 17/30424 |
| 9,912,957 | B1* | 3/2018 | Surti | G06T 1/20 |
| 2010/0325608 | A1* | 12/2010 | Radigan | G06F 8/456 |
| | | | | 717/106 |
| 2018/0308200 | A1* | 10/2018 | Surti | G06T 1/20 |

OTHER PUBLICATIONS

Ballard et al, "Hypergraph Partitioning for Sparse Matrix-Matrix Multiplication", ACM Transactions on Parallel Computing, vol. 3, No. 3, Article 18, pp. 1-34, 2016.*
Le et al, "Computing Betweenness Centrality in B-hypergraphs", ACM, pp. 2147-2150 (Year: 2017).*
Andre et al, "Memetic Multilevel Hypergraph Partitioning", ACM, pp. 347-354 (Year: 2018).*
Zhang et al, "Efficient Parallel Translating Embedding for Knowledge Graphs", ACM, pp. 460-468 (Year: 2017).*
Tristan et al, "Evaluating Value-Graph Translation Validation for LLVM", ACM, pp. 295-305 (Year: 2011).*

* cited by examiner

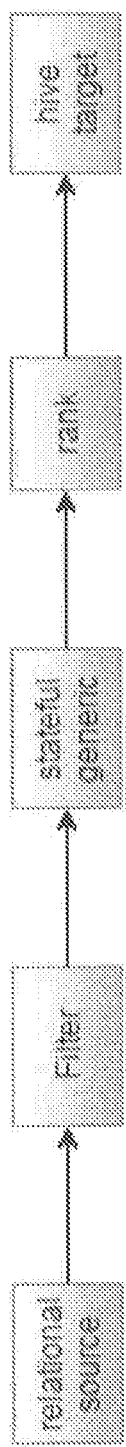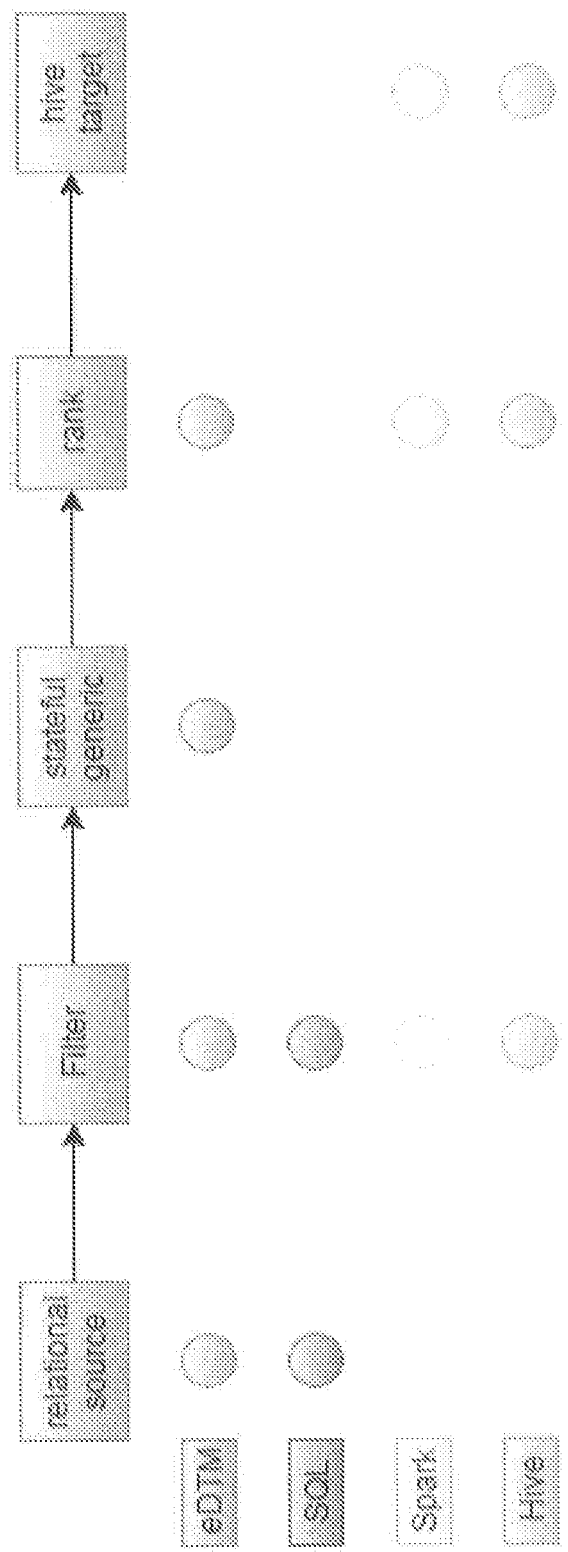
Fig. 16A
Fig. 16B

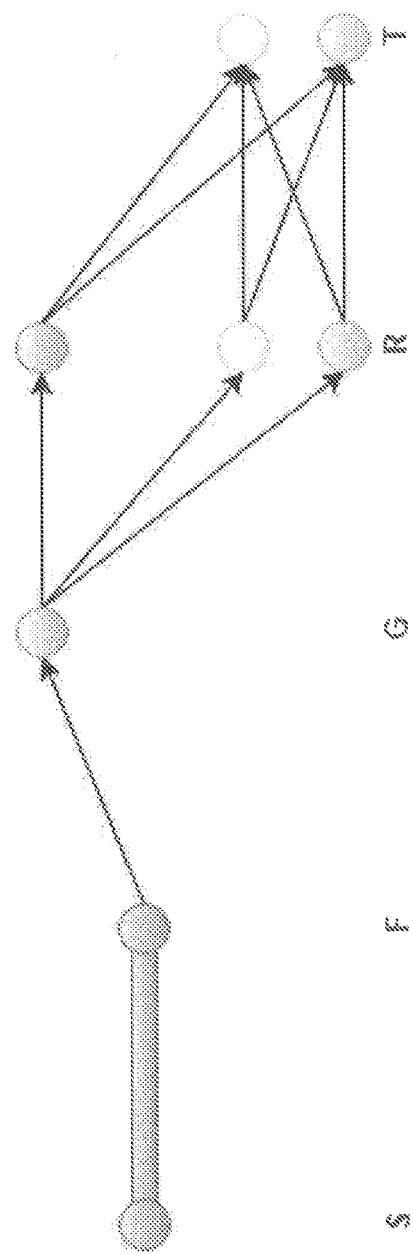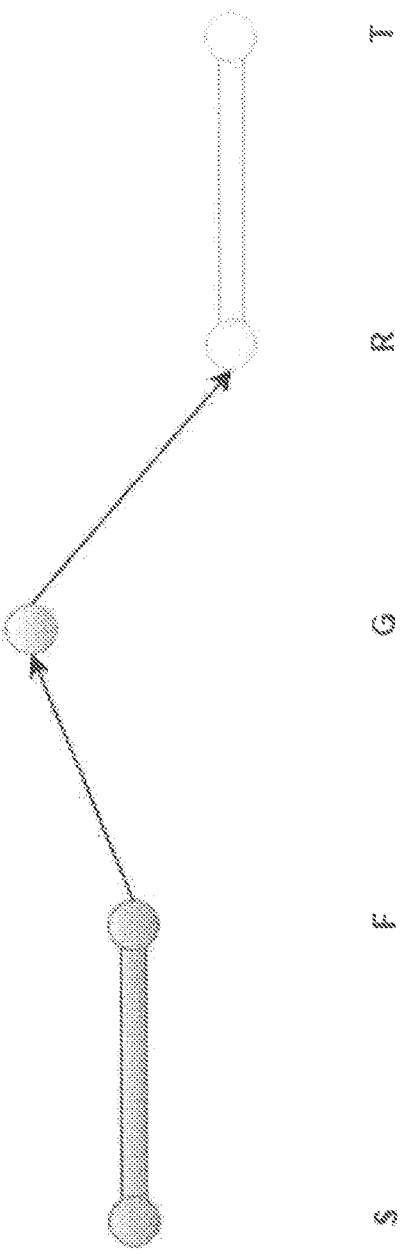
Fig. 17A
Fig. 17B

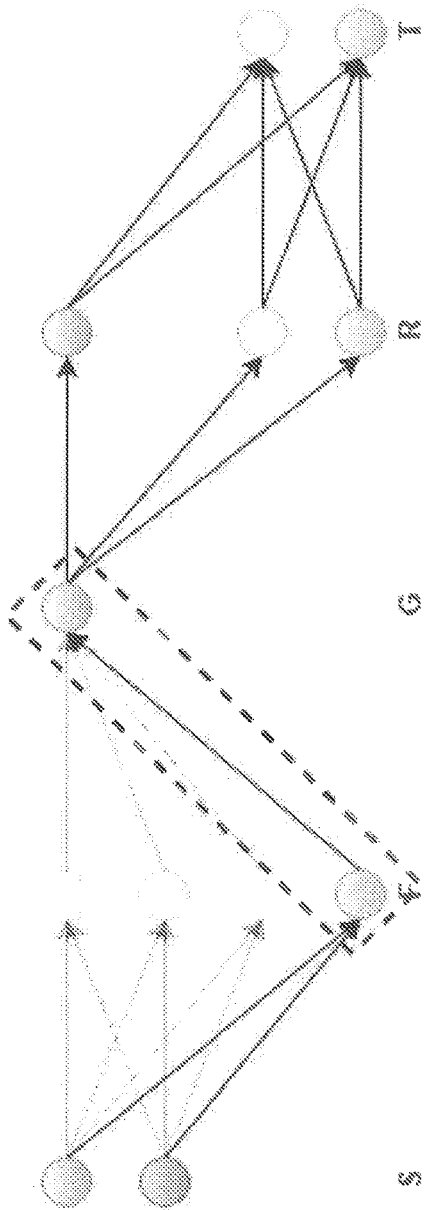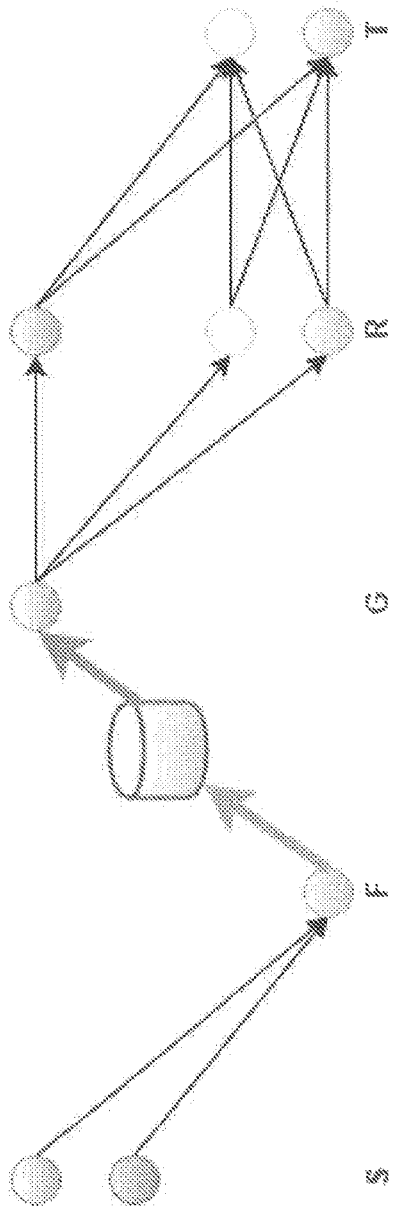

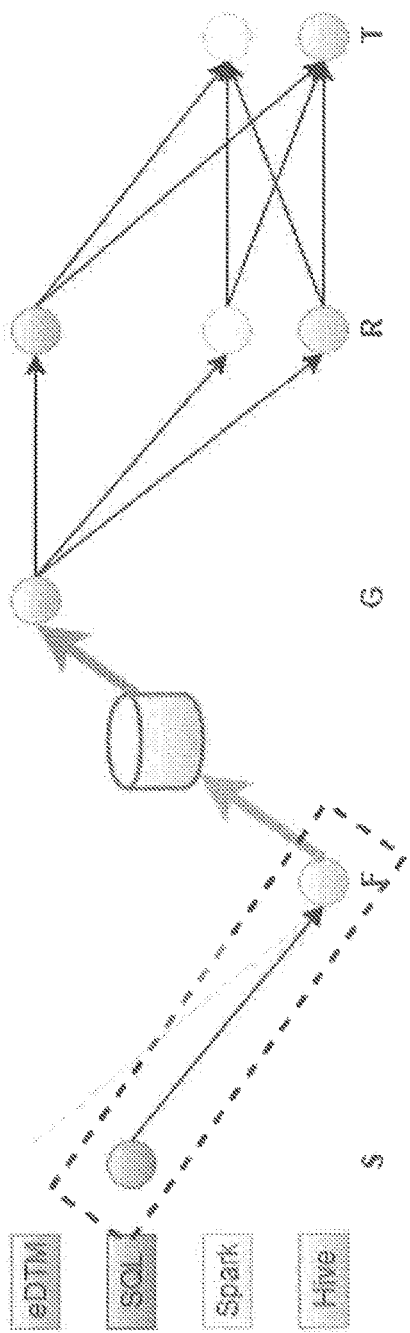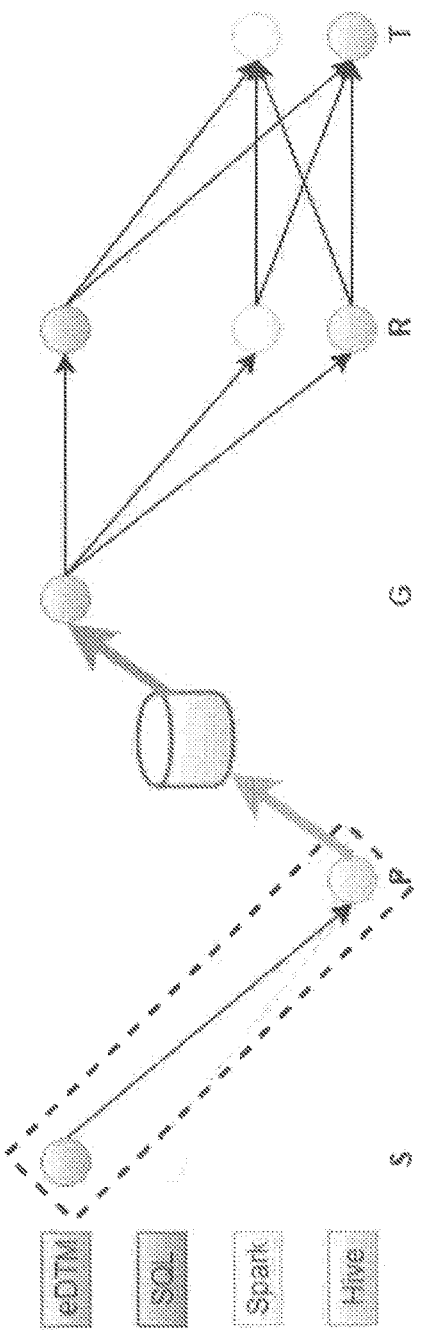

METHOD, APPARATUS, AND COMPUTER-READABLE MEDIUM FOR GENERATING AN ALTERNATIVE IMPLEMENTATION OF A PROGRAM ON ONE OR MORE ENGINES

BACKGROUND

Programs are sequences of logical operations on data. However, there may be many different practical ways to perform the same logical operation. A program comprising a sequence of logical operations can sometimes be written in more than one language, each language having its own syntax, data structures, and high level operations. In large or diverse computing environments there are frequently any number of ways to perform those operations.

In certain scenarios, it is computationally efficient to convert commands and functionality that are written in a first language into another language prior to execution. For example, given a first command in a first language which retrieves data from a relational database (a "relational Source" command) and a second command in a second language which filters data according to some criteria (a "filter" command), it would be computationally efficient to convert the second command into the first language and implement the filter as part of the relational Source command. If the first language is a database query language (such as structured query language—SQL), one way of doing this would be to convert the criteria used in the filter command into parameters inserted as part of a WHERE clause in the relational Source command. The WHERE clause would then be equivalent to the filter command. Additionally, the single relational Source command would implement the same functionality that previously required two different commands and two different languages and the associated resources (two different execution engines, interpreters, etc.).

This type of transformation is referred to herein as a "pushdown" operation. A pushdown operation, which is a type of logic translation, is the process of taking a program written in one language and translating it into an equivalent program written in another language. In this case, the filter command has been pushed down, resulting in saved bandwidth, CPU, and memory, which allows the program to scale much better and run much faster. Relational pushdown optimization is the transformation of certain program logic written in a first language into a second language used with relational databases. Pushdown optimization improves the overall program performance as the source database can sometimes process transformation logic faster than the native environment of the program.

However, the benefits and desirability of pushdown will vary depending on context and the particular command. Using the example of join commands, pushing down a traditional PK(primary key)-FK(foreign key) join (i.e. an inner join with an equality condition on unique columns) is likely to be as beneficial as pushing down a filter command. However, any other kind of join may result in a Cartesian product, which would not be computationally efficient to push down to the relational engine. This highlights an important difficulty: the desirability of a translation may be dependent on its context, which in turn highlights that a translation may be possible without being desirable.

Therefore, a current problem with existing logic translation frameworks (i.e., pushdown systems) is that the particular operations or commands to be pushed down (translated into other languages) must be known in advance, as well as the execution context, and the pushdown system must be tailored to the particular implementation.

A pushdown system could be designed that assumes that all pushdown will grow sequentially out from an adapter boundary and at every point only one kind of translation is available. While the cost of a search for alternative translations of operations in such a pushdown system would be somewhat linear, this type of pushdown system would still have a number of drawbacks.

The first drawback is that components of the system will not be reusable. Translation success will depend not only on the input logic and target domain, but also whether all of the translated pieces can fit together. For example—a Sybase query, which is a type of relational database language query used for Sybase databases, can only contain a maximum number of subqueries, so any translator that wants to include another must have a failure case for when the prior logic is too large. This makes it extremely difficult to use that translator in other contexts—not only is the intricacy of the combination code inseparable from the translation, but the dependency on the prior state also locks the translator to a specific traversal order and direction.

Another drawback is that at any given time, only one kind of translation is possible, even though important context information may not be available. A Data Transformation Machine (DTM), as used herein, refers to a program (a set of modules) that's responsible for actually executing particular transformation logic written in another program (sometimes referred to as an execution DTM or eDTM), analogous to how a Java virtual machine is a program that executes instructions written in Java. The term DTM can also refer to the individual execution of the modules or portions of modules in the program which makes up the larger DTM (sometimes referred to as a standalone DTM or saDTM) and/or the public application programming interface (API) or Data Integration Services that is interfaced with in order to control and monitor execution (sometimes referred to as a logical DTM or LDTM). In Hive, which is a data warehouse built on Apache Hadoop, transformations can be translated for execution on an saDTM, but there's a very high cost to jumping in and out of saDTMs, although consecutive saDTMs can be merged. While other transformations which may be part of the program can also be translated to an saDTM, translating them to native HiveQL (Hive Query Language) has many valuable advantages, so in many cases a translation to HiveQL would be preferable over a translation to an saDTM. However, if a subsequent operation will be translated to use an saDTM, then the cost of jumping in and out of saDTMs outweighs the benefits of running a particular transformation in HiveQL. Unfortunately, since each translation of each transformation operation is done in sequence, there is no way of knowing whether a not-yet-translated operation will be translated into an saDTM. This raises problems in determining how to translate particular operations, since the contextual information needed to choose the most efficient option is not available. For example, if the translation of operation X introduces an saDTM, and operation Y can be translated either way, and operation Z might introduce another saDTM, there is no way of knowing at the time of translation of operation Y whether to translate to an saDTM or to HiveQL. The only possible options for translating operation Y in such a situation are: (1) hardcoding the solution, knowing that in some cases it will be wrong, (2) attempting to provide a way to explore both translations, which would be a complex expansion of the framework that wouldn't be useful for any other purpose and would no longer run in linear time, or (3) attempting to delay the decision by capturing all possible translations before moving on to the next, which is far more complicated than simply augmenting the search and is not feasible for most situations.

An additional drawback of such a pushdown system would be that translation can only begin at fixed points. Artificially limiting translation to specific locations can rule out some very desirable execution strategies. However, trying to search for a beginning when it already takes linear time to find the end slows the algorithm significantly.

Furthermore, multiple kinds of translation cannot interoperate in such a pushdown system. Assuming five different engines to choose from for a particular program, for example, a native engine, an SQL engine, a Hive engine, an Informatica Blaze engine, and an Apache Spark engine, four of the engines would require translation to be used. However, if all of the engines have purpose-built translation frameworks that must run to completion before any other execution plan can be considered, there is no feasible way of utilizing more than one engine to execute the program. The only solution to this in such a system is to mandate that only one kind of engine can be in use at a time. However, since each engine supports a different set of operations, it would be necessary to rely on user configuration, heuristics, and even back-out behavior to determine which engine a particular session should use.

As discussed above, there is currently no logic translation system/pushdown system which provides an efficient, extensible, simple, reliable, and composable way to discover and compare alternative implementations.

BRIEF DESCRIPTION OF THE DRAWINGS

FIGS. 16A-16C illustrate an example of the translation of jobs in a job graph into a job hypergraph according to an exemplary embodiment.

FIGS. 17A-17D illustrate the generation of an alternative implementation using a sophisticated "smart driver" which incorporates various rules to help direct the process according to an exemplary embodiment.

FIGS. 19A-19G illustrate an example of a simple and random driver according to an exemplary embodiment.

DETAILED DESCRIPTION

Figure 1:
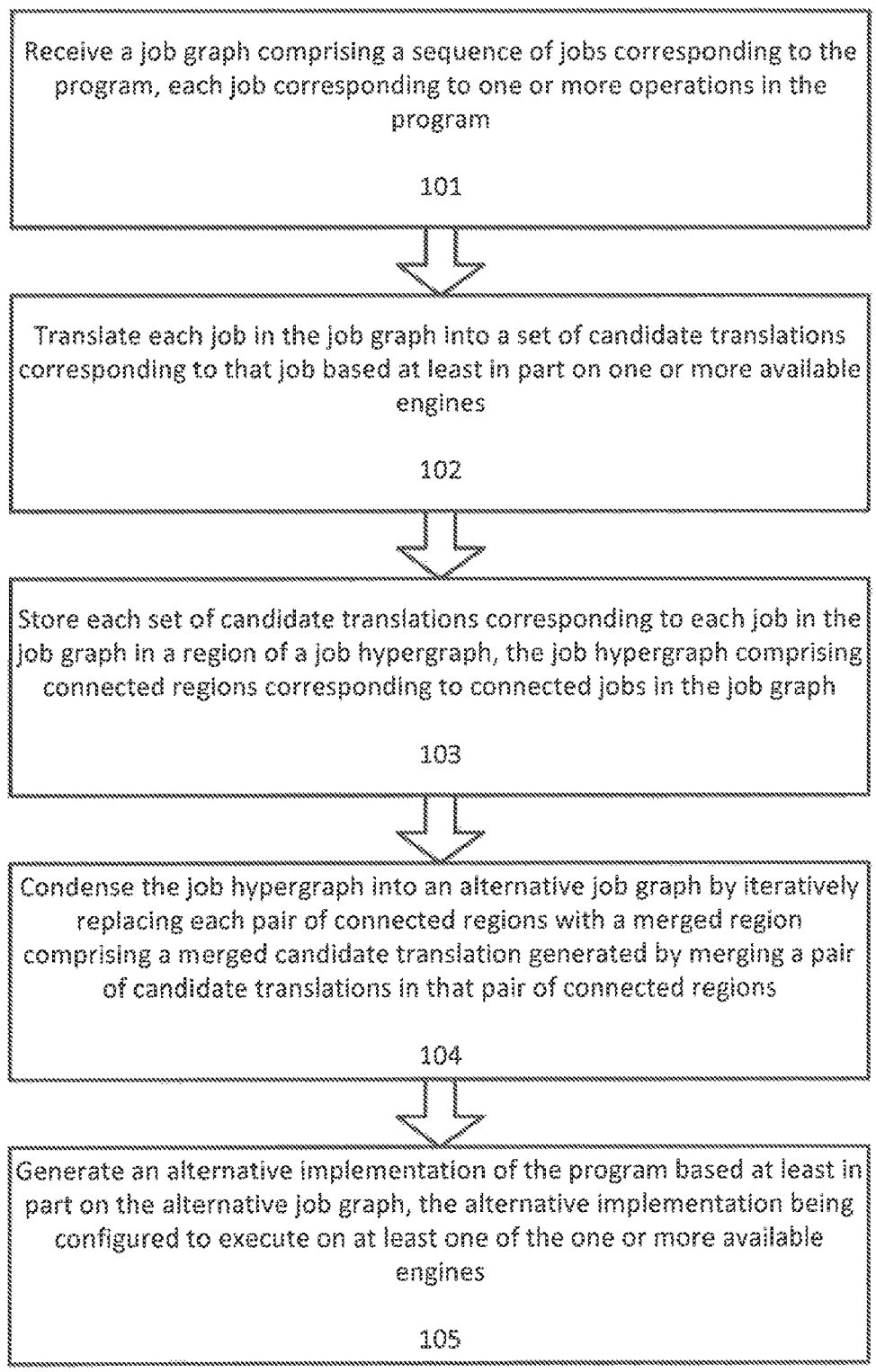
FIG. 1 illustrates a flowchart for generating an alternative implementation of a program on one or more engines according to an exemplary embodiment.

While methods, apparatuses, and computer-readable media are described herein by way of examples and embodiments, those skilled in the art recognize that methods, apparatuses, and computer-readable media for generating an alternative implementation of a program on one or more engines are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

As used herein, the term "pushdown framework" refers to a logic translation framework or system and the term DTM refers to an execution program which is responsible for actually executing a given mapping/program/logic code. As discussed above, current pushdown frameworks do not allow for comparisons between alternative implementations and are restricted us to linear sequences of decisions that must be made in order, which significantly increases the runtime cost of comparing alternatives. Additionally, current pushdown frameworks are necessarily specific to adapters, context, and even the directionality of the search, meaning that execution strategies cannot be compared in a context agnostic way. For example, it is not possible to compare a relational pushdown with hive pushdown independent of a particular context. Furthermore, current pushdown frameworks do not consider execution strategies that allow external processes to interact without an intervening DTM.

Applicant has discovered a system and method for generating an alternative implementation of a program on one or more engines which addresses the above-mentioned problems. The method, apparatus, and computer-readable medium described in the present application, referred to as the "Flex" framework, is a different way to approach the process of logic translation.

The Flex framework is universal, does not hardcode a traversal order, allows backing-out of previous selections, and assumes choices are non-binary. All prior translation frameworks were tailored for a specific engine. While this made operation conceptually simpler, it meant that the framework's interface, behavior, intelligence, state, and limitations were all non-reusable and non-portable, and frameworks could never interoperate with each other—each new engine necessitated an entirely new framework.

Since the Flex framework is universal across engines, all translation logic can be programmed to target a common interface. Moreover, allowing all choices to have multiple solutions means that not only can Flex compare execution strategies on the same engine, but it can also simultaneously compare executions across engines. Importantly, this extra power does not necessarily come with extra cost—the traversal can still be as simple as makes sense for the use case. Therefore, the Flex framework can easily achieve linear run time, if desired.

The Flex frameworks operates on units of a program called "jobs." A job can represent one or more operations, like a function call, or command line execution, or transformation invocation.

As discussed in the background section, components of current and prior frameworks are not reusable. One reason for this lack of reusability comes from Application Programming Interface (API) blurring or overfitting that inevitably occurs to purpose-built components within a purpose-built framework. An additional reason is that current and prior frameworks cannot distinguish the fundamentally different functions that are (1) translating a current job and (2) connecting the previous job to the current one (referred to as "merging."

For example, if operations X and Y are being translated to Hive, it may be logically equivalent to put them in the same HQL statement, separate them with a subquery, or even separate them with a staging table. However, if this choice must be made within the Y translator, then it would require implementation of three different Y translators that differ only in this one respect. Additionally, this same-query/subquery/stage code across all translators. For example, if operation X was followed by operation Z, then operation Z's translators would also have to attach the two states as well.

The Flex framework solves this problem by separating merge logic from translation logic and allows the framework to select merge functions independently of translators.

The Flex framework utilizes independent translators for each unit of the program (each job) being translated. By forcing translation to occur without knowledge of upstream or downstream state, translators become pure functions that model exactly one state change from an input to an output. This kind of function is very easy to reuse, convolve, and even generate—making translators extremely powerful. For example, given translators which translate a particular job between engines B→C, B→D, and B→E, simply adding one A→B translator implicitly constructs the A→C, A→D, and A→E translators for that job as well, with no additional implementation required.

Additionally, the Flex framework utilizes independent merge functions. Extracting merge functions is useful for far more than just freeing up the translators. In particular, by using independent merge functions, the framework is able to select the most attractive method of getting the output of a first job to the input of a second job. Additionally, since the Flex framework utilizes all available engines, the merge function is not necessarily limited to connected jobs which use the same engine. Since the only requirement of a merge function is to connect the output of one job with the input of another job, Flex provides a convenient, easily managed, and universal API for considering multi-engine execution strategies.

FIG. 1 illustrates a flowchart for generating an alternative implementation of a program on one or more engines according to an exemplary embodiment. At step 101 a job graph is received. The job graph is a directed acyclic graph and comprises a sequence of jobs corresponding to a program. Each job corresponds to one or more operations in the program, such as a function call, command line execution, transformation invocation, or even an entire session. Jobs can also optionally have job identifiers corresponding to different job types. For example, jobs which involve filtering a data set using some criteria can be assigned some identifier corresponding to a "filter" job type. The job identifiers can take any form.

The job graph can take a variety of forms and can be received through a variety of APIs. The job graph can include an actual input program and mappings between particular instructions and operations in the program and jobs. For example, the job graph can include a program and also include a mapping file which specifies which lines of the program correspond to which jobs, such as "lines 2-5→Job_ID=3" indicating that lines 2-5 of the program correspond to a job having an identifier of "3." Alternatively, the input program can be contained in a wrapper class which allows the Flex framework to interrogate the wrapper and identify which job corresponds to each portion of the program. For example, the wrapper class can include functionality, such as a parser or regular expression matcher, for identifying particular jobs or types of jobs.

The job graph can be received by a component of the Flex framework called the "driver." The driver can be implemented in software or hardware or a combination of hardware and software and is responsible for orchestrating the process for generating an alternative implementation of the program. As will be discussed further below, this includes inspecting the input job graph, figuring out which translators to use, deciding which translations to accept, where to consider merging first, which merge functions to use, backing out of uninteresting search paths, and confirming the final result.

While the Flex framework and the driver are not required to understand the internals of particular job or job graph, the driver can optionally include logic for analyzing and utilizing job attributes and utilizing that information in its decisions. The tradeoff in this case is that specializing in a particular domain may produce better results, but is a significant investment and often non-portable. The Job API is mostly an extension point, intended for external implementation.

Figure 2:
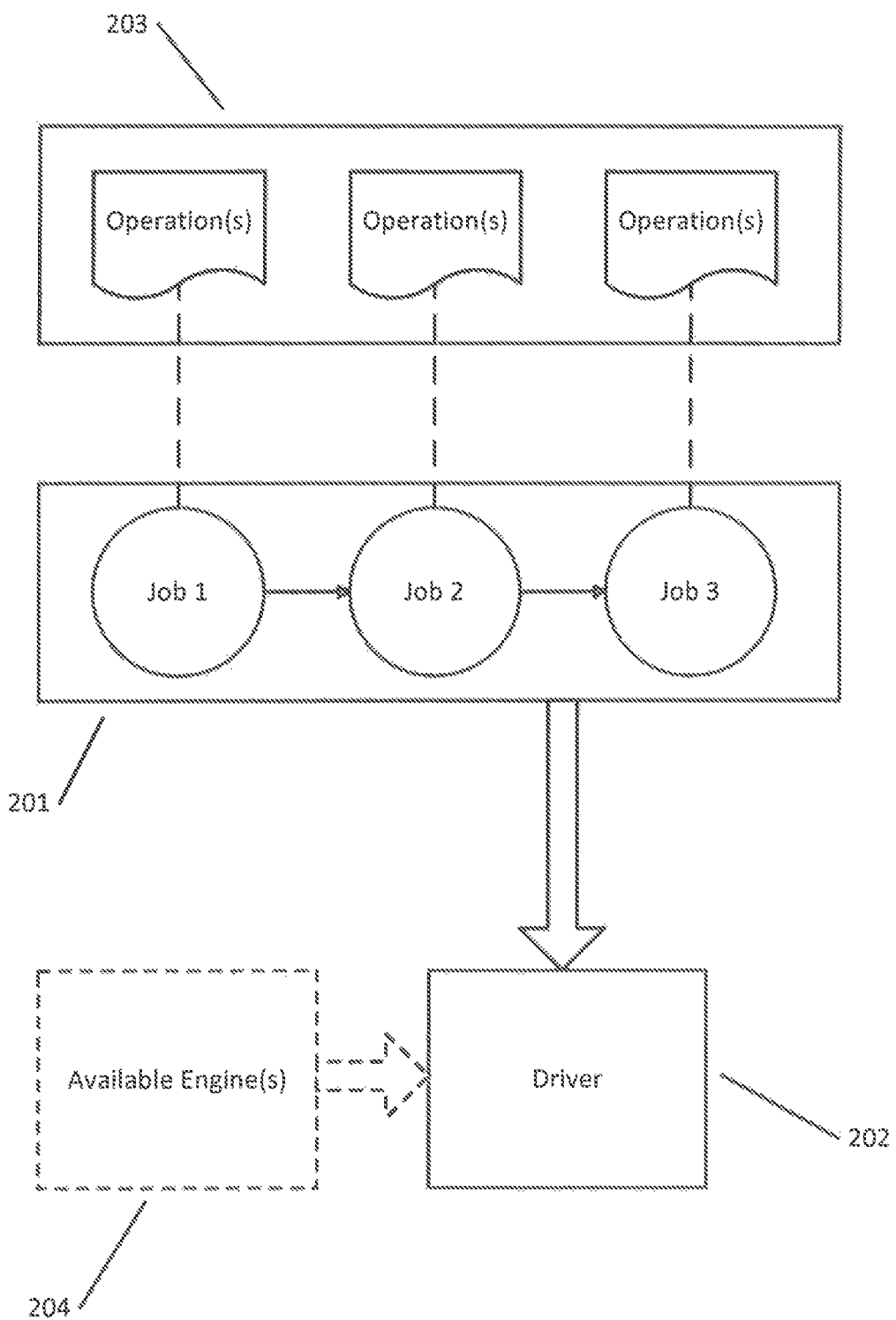
FIG. 2 illustrates an example of a driver 202 receiving an input job graph 201 comprised of three jobs according to an exemplary embodiment.

FIG. 2 illustrates an example of a driver 202 receiving an input job graph 201 comprised of three jobs according to an exemplary embodiment. As shown in the figure, each of the jobs corresponds to one or more operations in program 203. The driver can optionally also receive a selection or indicator of identifiers of the available engine(s) 204 which are available for execution of an alternative implementation of the program 203. Alternatively, the driver can just receive the job graph and can independently access information regarding available engines, either from internal memory, or from data storage external to the driver.

Returning to FIG. 1, at step 102 each job in the job graph is translated into a set of candidate translations corresponding to that job based at least in part on the one or more available engines. As discussed above, the one or more available engines can be received by the driver when the job graph is received, can be located in storage accessible to the driver, or can be accessed by the driver in some other manner. Each candidate translation comprises a translation of the one or more operations corresponding to that job into one or more translated operations configured to execute that job on an available engine in the one or more available engines.

An engine is an available execution environment, like an eDTM (execution Data Transformation Machine), spark cluster, hive cluster, command terminal, etc. Engines are representations of execution platforms and the Engine API is an extension point, which can be externally implemented. Engines can report identifier tokens to assist with translator and merge function lookups, but can also contain more minor configuration details to control parts of the system in a more fine-grained way.

Figure 3:
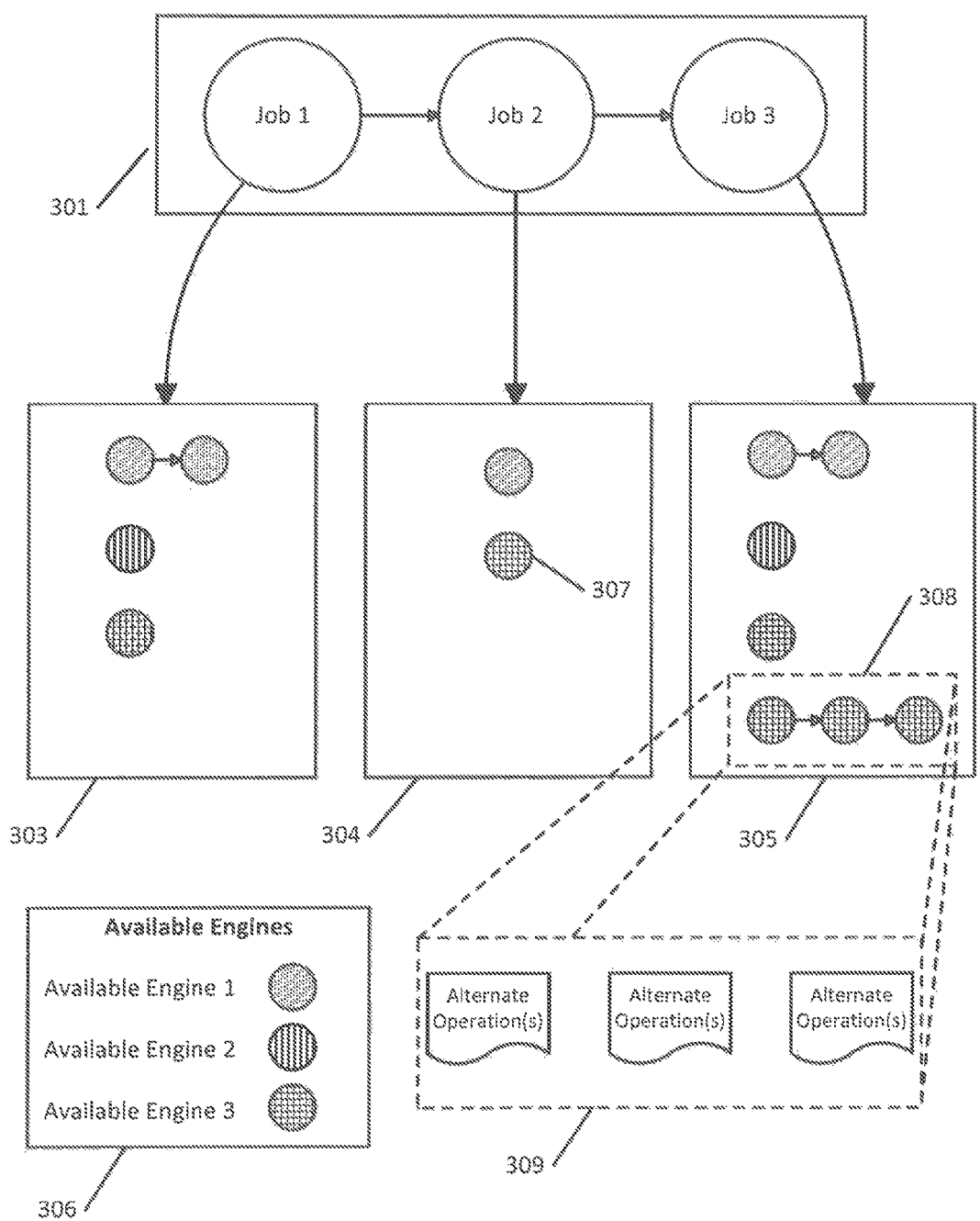
FIG. 3 illustrates an example of translating each job in the job graph into a set of candidate translations corresponding to that job based at least in part on the job identifier for that job and one or more available engines according to an exemplary embodiment.

FIG. 3 illustrates an example of translating each job in the job graph into a set of candidate translations corresponding to that job based at least in part on the one or more available engines according to an exemplary embodiment. As shown in FIG. 3, Job 1 in job graph 301 has been translated into the three candidate translations shown in box 303, Job 2 in job graph 301 has been translated into the two candidate translations shown in box 304, and Job 3 in job graph 301 has been translated into the four candidate translations shown in box 303. Each candidate translation is itself a job graph, with each node corresponding to a job, and is implemented on one of the available engines, shown in box 306. For example, candidate translation 307 is a job graph having one job that is implemented using available engine 3. Each of the jobs in the job graphs of the candidate translations correspond to one or more translated operations configured to execute the job on one of the available engines. For example, candidate translation 308 is a job graph having three jobs, each of which corresponds to one or more translated operations in program 309.

The translated operations are not necessarily one-to-one translations on a per-operation basis. For example, job 3 in job graph 301 has been translated into four candidate translations, two of which are job graphs having one job, one of which is a job graph having two jobs, and one of which is a job graph having three jobs. Since each job in the original job graph 301 is translated into job graphs corresponding to operations configured to execute on available engines which are potentially different than the original engine used for the original program, the job graphs for the translations can require more jobs than would be required if implemented using the original engine.

The actual process of translating jobs in the original job graph into the candidate translation(s) is not performed by the driver but rather by "translators." Translators are components of the Flex framework which, when given a job and an available engine, return a candidate translation comprising job graph that is functionally equivalent to the given job. Each translator can be specialized and capable of understanding only one specific combination of job and available engine. For example, one translator might be able to convert an Informatica JoinTx to a SQL join, and it would not be applicable to converting an AggregatorTx to Spark. Alternatively, translators can be implemented in such a way that each translator corresponds to a particular job and include sub-translators which translate that job into one or more available engines. Translators can be implemented in software (such as by functions), hardware, or some combination of the two.

Figure 4:
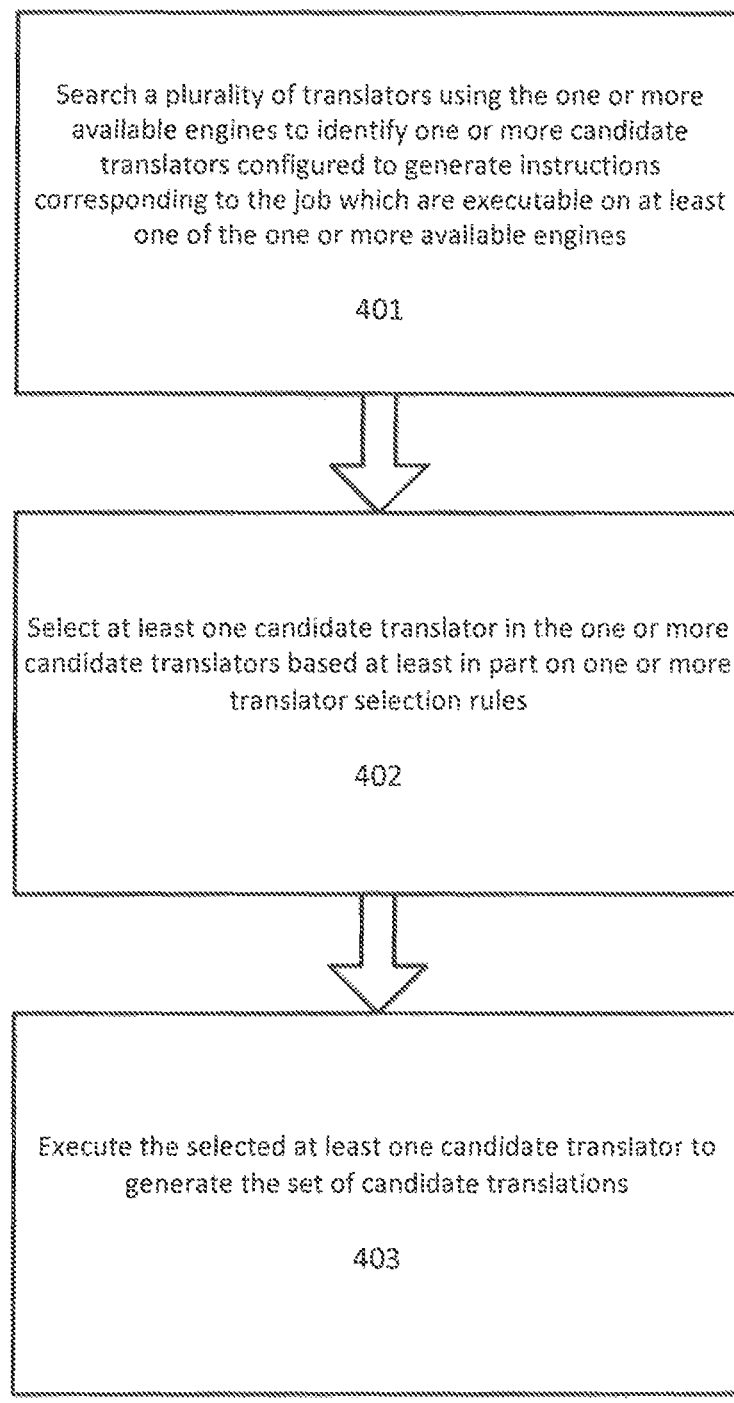
FIG. 4 illustrates a flow chart for translating each job in the job graph into a set of candidate translations corresponding to that job based at least in part on the job identifier for that job and one or more available engines according to an exemplary embodiment.

Translators can be looked up, generated, or otherwise selected by a component of the driver called the "translator provider" which is discussed in greater detail below. For example, the appropriate translators for each job can be searched for by the translator provider using some criteria. Alternatively or additionally, the appropriate translators can be generated by the translator provider. In some cases where the input job already executes on the target engine, the translator provider could use a reflex translator—i.e. a translator that simply returns the job it was given FIG. 4 illustrates a flow chart for translating each job in the job graph into a set of candidate translations corresponding to that job based at least in part on one or more available engines according to an exemplary embodiment. At step 401 a plurality of translators are searched to identify one or more candidate translators configured to generate instructions corresponding to the job which are executable on at least one of the one or more available engines. The plurality of translators can be stored in a translator library which is accessible and/or searchable by the driver.

In implementations where job types are assigned identifiers, step 401 can include searching the plurality of translators using the assigned identifier(s) for job type(s) of the job which is being translated. The job to be translated can of course have multiple types, in which case the identifiers for all of the types can be used as search keys. Search keys for the search process can include identifiers, job types, target engines, source engines, source types or subtypes, connection types or subtypes, or any other relevant criteria.

At step 402 at least one candidate translator in the one or more candidate translators is selected based at least in part on one or more translator selection rules. Translator selection rules can govern which translators are selected and can be based on relevant factors such as available engines, availability of equivalent operations in the available engines, or any other custom criteria defined for a particular implementation. At step 403 the selected candidate translator(s) is executed to generate the set of candidate translations. Steps 401-403 are repeated for each job in the input job graph, resulting in a set of candidate translations corresponding to each job.

Figure 5:
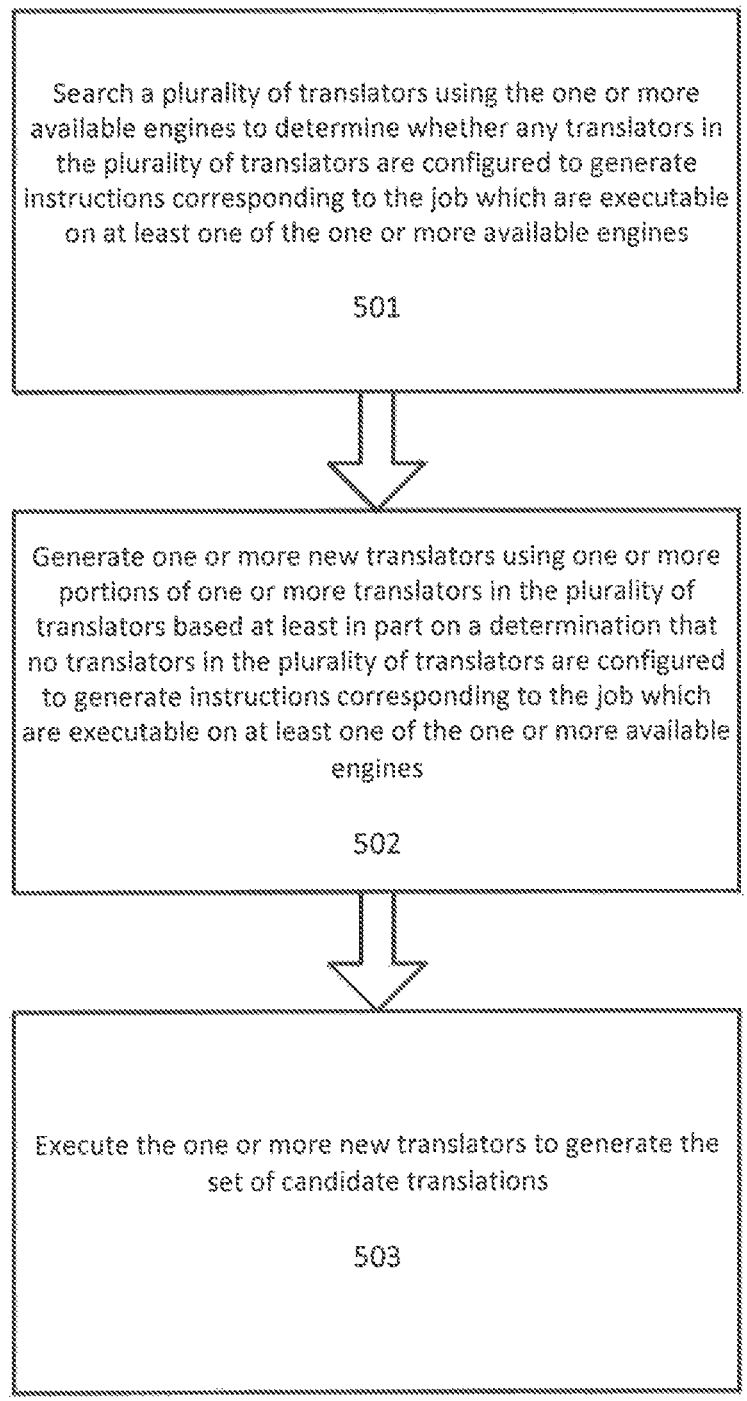
FIG. 5 illustrates a flow chart for translating each job in the job graph into a set of candidate translations corresponding to that job based at least in part on the job identifier for that job and one or more available engines when translators are required to be generated according to an exemplary embodiment.

The driver or some other component of the Flex framework can also be used to generate a translator for a particular job when a translator does not exist. FIG. 5 illustrates a flow chart for translating each job in the job graph into a set of candidate translations corresponding to that job based at least in part on the job identifier for that job and one or more available engines when translators are required to be generated according to an exemplary embodiment. At step 501 a plurality of translators are searched using the job identifier to determine whether any translators in the plurality of translators are configured to generate instructions corresponding to the job which are executable on at least one of the one or more available engines. At step 502 one or more new translators are generated using one or more portions of one or more translators in the plurality of translators based at least in part on a determination that no translators in the plurality of translators are configured to generate instructions corresponding to the job which are executable on at least one of the one or more available engines. The one or more new translators are configured to generate instructions corresponding to the job which are executable on at least one of the one or more available engines. The translation logic for the new translators can be generated based on one or more translator construction rules and the characteristics of the original job engine and the available engine which is the target of the translation. For example, in certain situations, the conversion from one engine to another can involve a simple substitution or adjustment of syntax. In this case, the translator construction rules can specify which adjustments are necessary depending on the source engine and the target available engine and the new translator can be saved to a translator library for reusability. At step 503 the one or more new translators are executed to generate the set of candidate translations. Steps 501-503 can be repeated for each job in the input job graph for which a translator is not found and is required to be generated.

The processes shown in FIGS. 4-5 can be performed by a sub-component of the driver called the "translator provider." The translator provider can be a software function or hardware implemented logic which, given a job and identifying information for one or more available engines, returns a list of candidate translators to the driver. The translator provider abstracts the process of locating or generating the translators, making it possible to apply the same driver intelligence in multiple contexts without needing to inspect job or engine state.

This feature helps keep translator logic simple. For example, translators only return one translation each, but if the same "wrapper logic" might apply to a different family of translators, the wrapper can't be implemented as an individual translator. A translator provider would be able to solve this by recovering the translators from the alternate family and then wrapping them individually. Translator providers can also perform a "first pass" over the possible translators and reject any that should not be used based on the translation selection rules. This filtering functionality can additionally be nested. Translator providers can also assist with driver intelligence by returning results in an ordered collection. As with other aspects of the driver, the translator provider API is an extension point.

Figure 6:
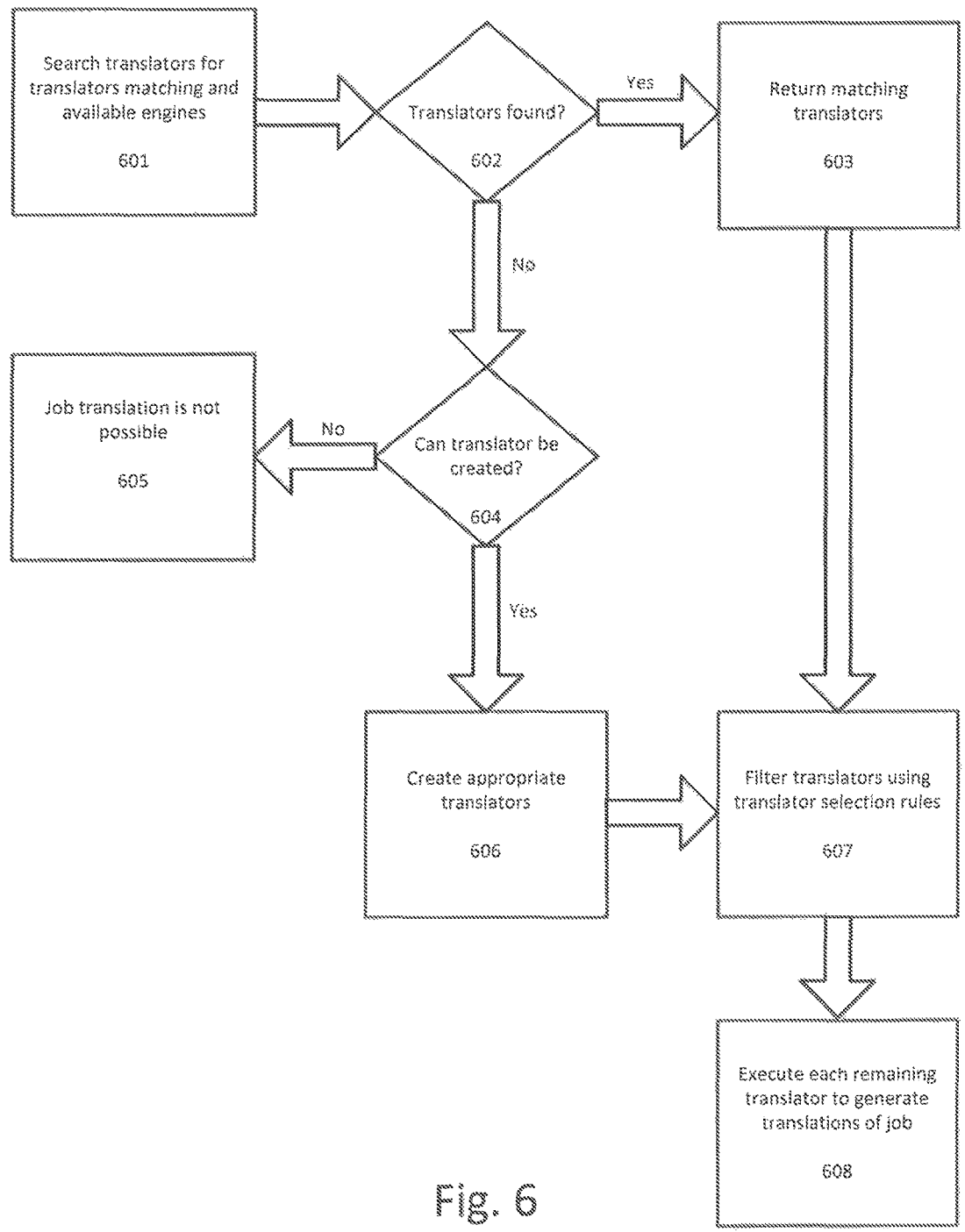
FIG. 6 illustrates a process flow diagram for translating a job in the job graph into a set of candidate translations corresponding to that job based at least in part on the job identifier for that job and one or more available engines according to an exemplary embodiment.

Of course, the processes shown in FIGS. 4-5 can be implemented simultaneously. FIG. 6 illustrates a process flow diagram for translating a job in the job graph into a set of candidate translations corresponding to that job based at least in part on the job identifier for that job and one or more available engines according to an exemplary embodiment. At step 601 the translators (such as translators stored in a library or database) are searched for translators which produce an output configured to run on one of the one or more available engines. At step 602 a determination is made regarding whether translators matching the one or more available engines have been found. If so, the matching translators are returned at step 603. If not, then a determination is made regarding whether a translator can be generated at step 604. This determination can be based upon an analysis of one or more translator generation rules, the one or more available engines, and optionally, additionally driver specific logic regarding the characteristics of the jobs. If a translator cannot be generated then at step 605 the system determines that the job cannot be translated. Otherwise, one or more translators are generated at step 606. At step 607 the translators (either found through the search or generated) are filtered using translator selection rules. These translator selection rules can alternatively be used during the search and/or generation steps rather than being applied as a separate step. At step 608 each of the translators remaining after the filtering step are executed to generate one or more translations of the job.

Of course, FIG. 6 is presented by way of example only, and many variations are possible. For example, it is not necessary that a search be conducted for a matching translators prior to generating a suitable translator or translator. The translator provider component of the driver may automatically generate suitable translators, look up translators, or perform any other functionality which results in a translator being provided to translate the input job into a translation.

Returning to FIG. 1, at step 103 each set of candidate translations corresponding to each job in the job graph is stored in a region of a job hypergraph. The job hypergraph can be thought of as a "merge space" which includes, at least initially, all possible candidate translations of each of the jobs in the job graph. As will be discussed in additional detail below, the merge space makes it possible for a driver to efficiently explore translation and merge options among candidate translation. These candidate translations are grouped into regions, which can be thought of as "hypernodes," and which correspond to the jobs in the input job graph. The job hypergraph preserves the connectedness and links between jobs in the input job graph. For example, the job hypergraph comprises connected regions corresponding to connected jobs in the job graph. Of course, if for some reason the job graph included unconnected jobs, then the job hypergraph would include unconnected regions corresponding to the unconnected jobs as well.

Each region or hypernode in the job hypergraph is a collection of functionally equivalent job graphs (candidate translations) which correspond to instructions that achieve the same result as the job in the original job graph which corresponds to that region. Additionally, since any one of the candidate translations in a particular region could potentially be selected for the alternative implementation of the input program, all of the candidate translations take in the same input and have the same output.

The job hypergraph can be represented by any suitable data structure used to represent directed graphs, such as linked lists, arrays, trees, or any other platform specific data structure. Additionally, the storing of the candidate translations in a particular region can include storing the candidate translations in a corresponding region data structure and/or can include linking or mapping the candidate translations to corresponding regions or hypernodes of the job hypergraph such that the candidate translations are "stored" in that region by association rather than a literal storing of data within a particular container. For example, a dynamic array associated with each region in the job hypergraph can store the candidate translations which are part of that region or some data structure associated with each region can include pointers to each of the candidate translations which are associated with that region.

Figure 7:
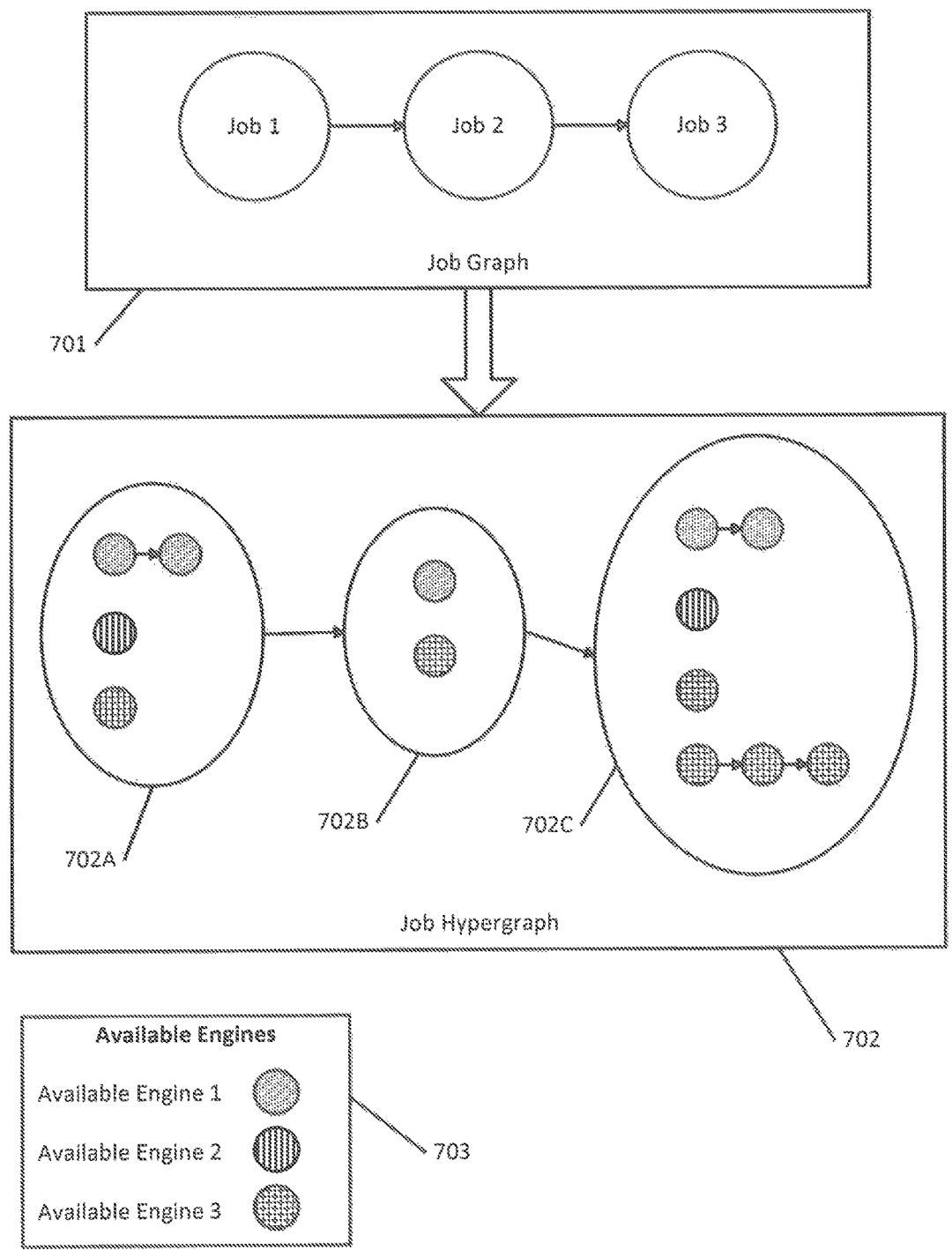
FIG. 7 illustrates a job hypergraph including regions corresponding to jobs in a job graph according to an exemplary embodiment.

FIG. 7 illustrates a job hypergraph including regions corresponding to jobs in a job graph according to an exemplary embodiment. As shown in the figure, job hypergraph 702 includes region 702A which includes three candidate translations of job 1 in job graph 701, region 702B which includes two candidate translations of job 2 in job graph 701, and region 702C which includes four candidate translations of job 3 in job graph 701. The regions of the job hypergraph 702 are also connected in the same way as the jobs in job graph 701. This means that the output of region 702B is provided as input to region 702C in the same way that the output of job 2 is provided as input to job 3. FIG. 7 also illustrates a key 703 indicating the available engines which are used to implement the candidate translations in the job hypergraph 702.

Returning to FIG. 1, at step 104 the job hypergraph is condensed into an alternative job graph by iteratively replacing each pair of connected regions with a merged region comprising a merged candidate translation generated by combining a pair of candidate translations in that pair of connected regions.

Figure 8:
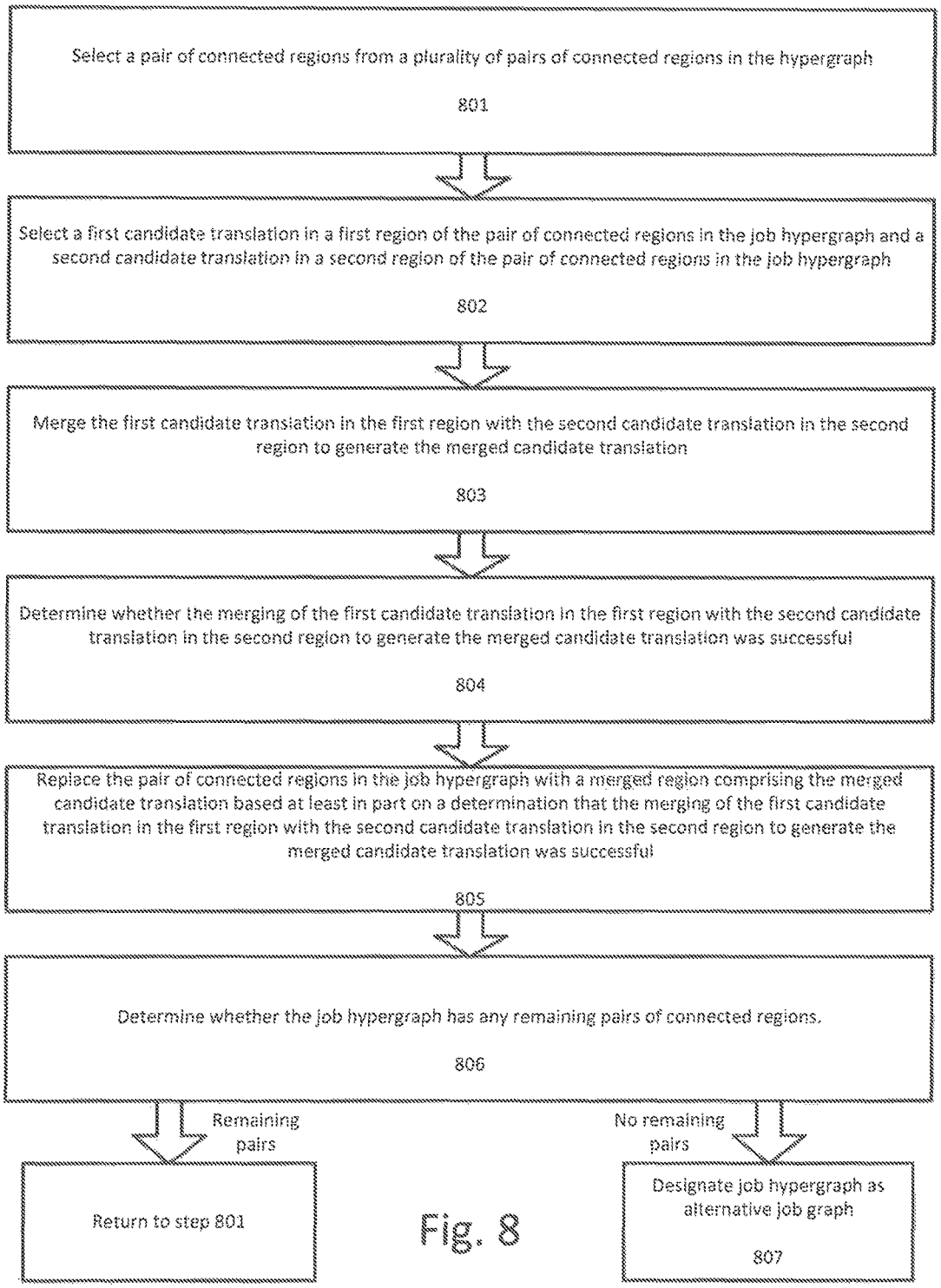
FIG. 8, which illustrates a flowchart for condensing the job hypergraph into an alternative job graph by iteratively replacing each pair of connected regions with a merged region comprising a merged candidate translation generated by combining a pair of candidate translations in that pair of connected regions according to an exemplary embodiment.

This iterative replacement process is described with respect to FIG. 8, which illustrates a flowchart for condensing the job hypergraph into an alternative job graph by iteratively replacing each pair of connected regions with a merged region comprising a merged candidate translation generated by combining a pair of candidate translations in that pair of connected regions according to an exemplary embodiment.

At step 801 a pair of connected regions is selected from a plurality of pairs of connected regions in the hypergraph. The pair of connected regions can optionally be selected based at least in part on one or more merge investigation rules which are part of the driver logic. Alternatively, the pair of connected regions can be selected randomly or in sequential order of occurrence within the job hypergraph.

Figure 9A:
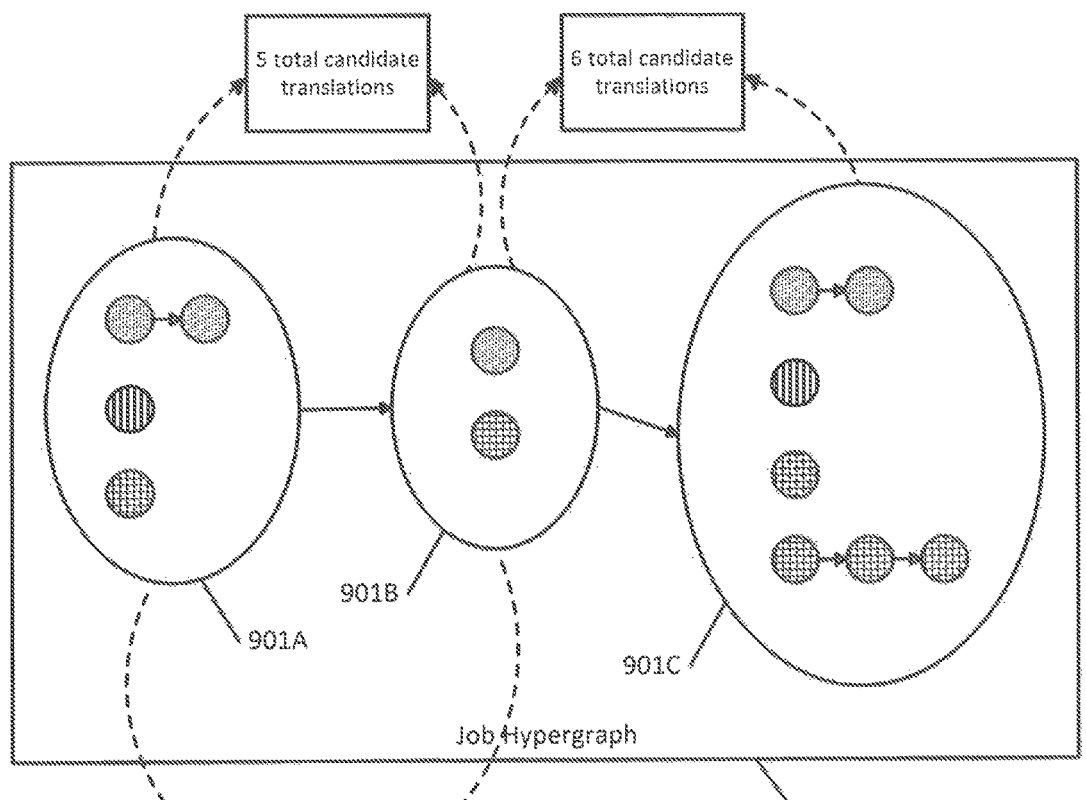
FIG. 9A illustrates an example of the selection of a pair of connected regions based on a merge investigation rule according to an exemplary embodiment.
Figure 9A:
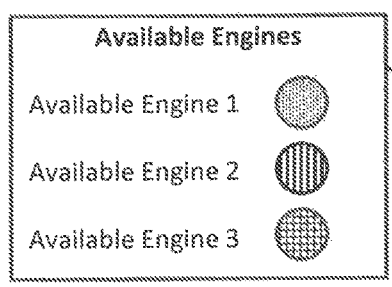

FIG. 9A illustrates an example of the selection of a pair of connected regions based on a merge investigation rule according to an exemplary embodiment. As shown in FIG. 9A, the merge investigation rule specifies that the pair of connected regions having the fewest total candidate translations should be selected. Since the pair of connected regions 901A and 901B in job hypergraph 901 have a total of 5 candidate translations and the pair of connected regions 901B and 901C in job hypergraph 901 have a total of 6 candidate translations, then the pair of connected regions 901A and 901B are selected based on the merge investigation rule. Of course, this example is provided for illustration only and a variety of merge investigation rules can be utilized. For example, the driver can utilize a merge investigation rule which specifies that pairs of regions having at least one candidate translation configured to execute on the same available engine should be selected prior to pairs of regions which have candidate implements which only execute on different available engines. Additionally, multiple merge investigation rules can be stacked and/or nested when selecting the pair of connected regions in the job hypergraph.

Returning to FIG. 8, at step 802 a first candidate translation in a first region of the selected pair of connected regions in the job hypergraph and a second candidate translation in a second region of the selected pair of connected regions in the job hypergraph are selected. Once again, the specific candidate translations which are selected can be based on driver-specific translation selection rules which govern the selection process. For example, translations which correspond to a particular engine may be given preference over other translations, depending on the specific rules and execution context. Alternatively, this selection can also be made at random and/or sequentially without any special selection logic.

At step 803 the first candidate translation in the first region is merged with the second candidate translation in the second region to generate the merged candidate translation. This merger process is described in greater detail below and is performed by merge components (which can be merge functions) which are called by the driver.

Figure 9B:
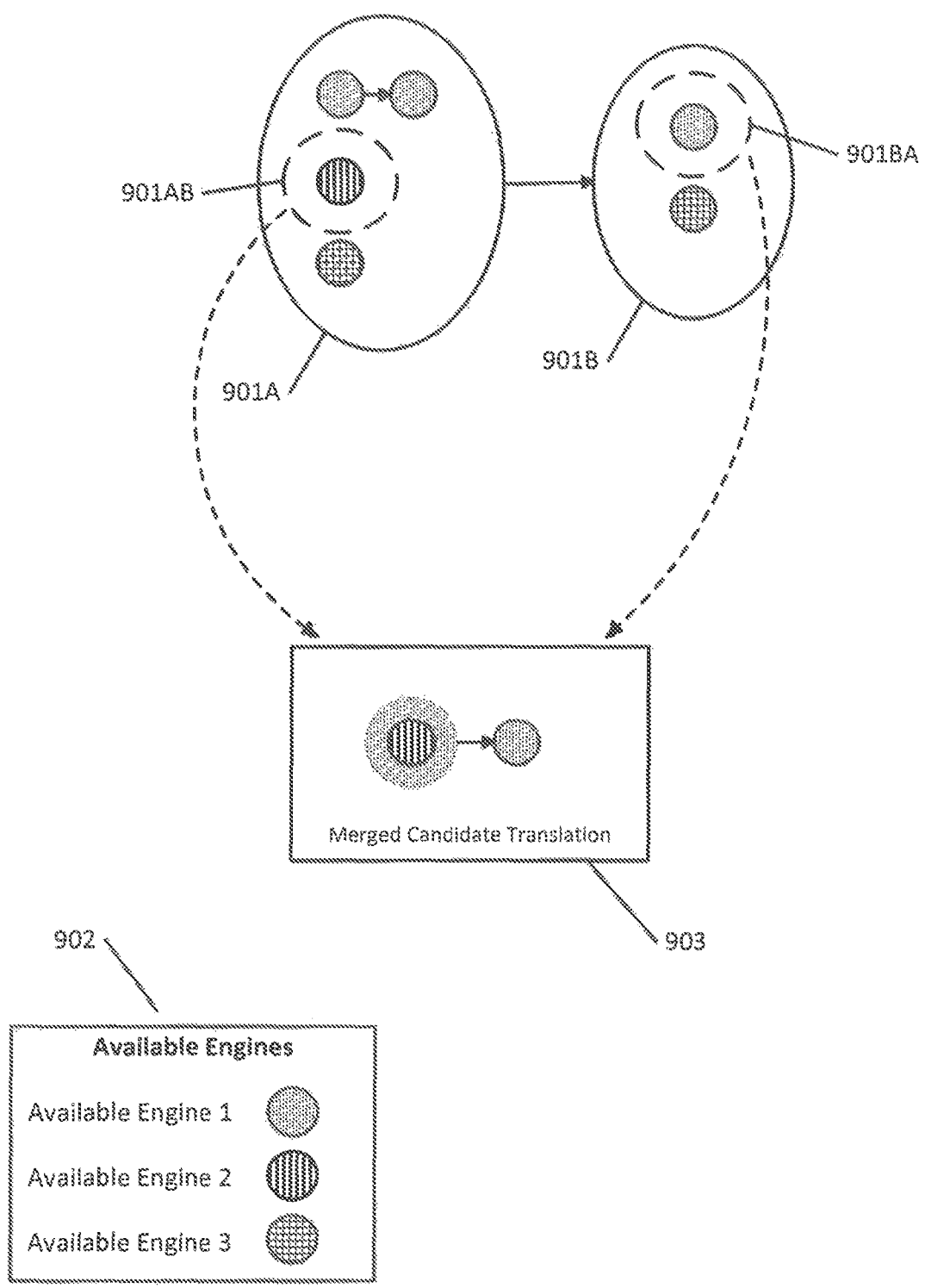
FIG. 9B illustrates an example of the merging of two candidate translations from connected regions in the hypergraph according to an exemplary embodiment.

FIG. 9B illustrates an example of the merging of two candidate translations from connected regions in the hypergraph according to an exemplary embodiment. As shown in FIG. 9B, candidate translation 901AB in region 901A and candidate translation 901BA in region 901B have been selected for merging. The merged candidate translation 903 corresponds to the merger of both of these candidate translations in regions 901A and 901B. As shown in the merged candidate translation 903, the sole job in candidate translation 901AB is surrounded by a circle corresponding to the available engine for candidate translation 901BA. This indicates that, in this particular merger, the operations corresponding to candidate translation 901AB can be called using the engine corresponding to candidate translation 901BA (available engine 1), even though the operations themselves are executed on a different available engine (available engine 2). Of course, in situations where the operations executed on an engine cannot be called from a different engine, the merging can include some other process by which information is transferred, such as writing output of the first translation in the first region of the pair of regions to file and reading the file to provide input to the second translation in the second region of the pair of regions.

Returning to FIG. 8, at step 804 it is determined whether the merging of the first candidate translation in the first region with the second candidate translation in the second region to generate the merged candidate translation was successful. This determination can be based on the output provided by the merge function and/or based on a determination made by the driver. For example, the driver can determine that the merge was successful if the merge function provides a merged translation and determine that the merge was unsuccessful is the merge function indicates a failure to merge. Additionally, the driver can determine that the merge was unsuccessful if it is unable to locate or create a suitable merge function or if it determines that the merged translation is not acceptable based upon one or more driver specific rules.

At step 805 the pair of connected regions in the job hypergraph are replaced with a merged region comprising the merged candidate translation based at least in part on a determination that the merging of the first candidate translation in the first region with the second candidate translation in the second region to generate the merged candidate translation was successful. This step results in the removal of any other candidate translations that were in the first region or the second region and leaves on the merged candidate translation in the merged region. Additionally, this step includes linking the merged region with the remaining regions of the job hypergraph such that any other regions in the job hypergraph that were previously connected to the pair of regions that were merged are connected to the merged region. This step also includes the mapping of any external input or output handles from the pair of regions to the merged region, such that any outputs from the second region in the pair are outputs from the merged region and any inputs to the first region in the pair are inputs to the merged region.

Figure 9C:
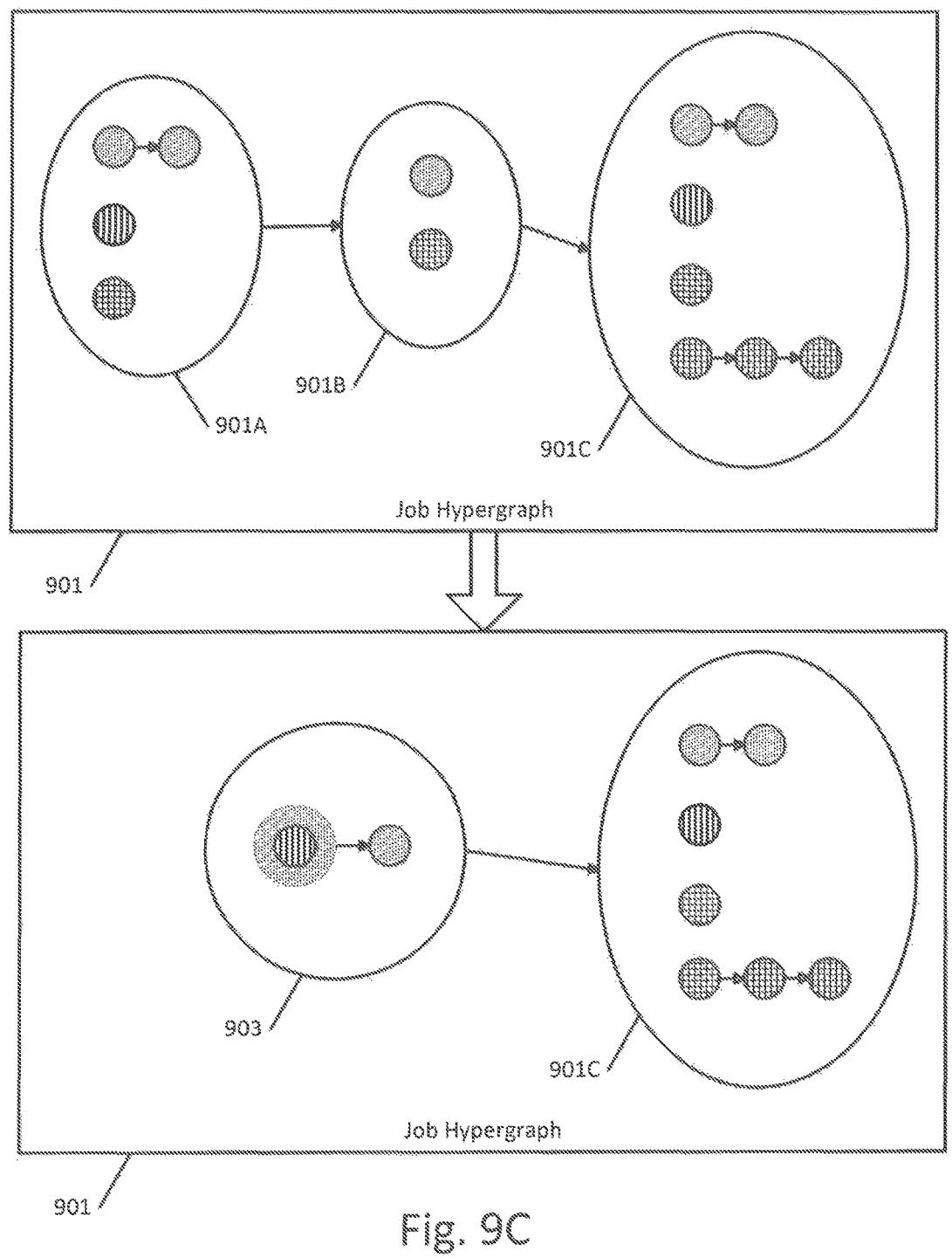
FIG. 9C illustrates an example of the replacement of a pair of connected regions in the job hypergraph with a merged region according to an exemplary embodiment.

FIG. 9C illustrates an example of the replacement of a pair of connected regions in the job hypergraph with a merged region according to an exemplary embodiment. As shown in FIG. 9C, regions 901A and 901B in the job hypergraph 901 are merged, resulting in a singled merged region 903. Since region 901B was previously connected to region 901C, the merged region 903 is connected to region 901C and the output of the merged region 903 is provided as input to region 901C. Additionally, any inputs that previously would have been provided to region 901A are now provided to merged region 903.

Returning to FIG. 8, at step 806 it is determined whether the job hypergraph has any remaining pairs of connected regions. If there are no remaining pairs of connected regions, this step can additionally include determining whether at least one region in the job hypergraph comprises more than one candidate translation. This could arise if connected regions are all paired off, leaving one or more unconnected regions which contain multiple candidate translations. If this is the case, the driver can use driver-specific rules, logic, or random selection to select a candidate translation in the remaining unconnected regions.

If there are no remaining pairs of connected regions in the job hypergraph (and all regions have one candidate translation), then the job hypergraph is effectively a job graph, since all candidate translations in connected pairs of regions will have been merged into a single merged candidate translation in a single merged region. At step 807 this job hypergraph can be designated as the alternative job graph and used to generate the alternative implementation of the program. On the other hand, if there are remaining pairs of connected regions in the job hypergraph, then the process can return to step 801 where a new pair of connected regions is selected. The process then repeats until no connected pairs of regions remain (and no unconnected region contains more than one candidate translation).

Figure 9D:
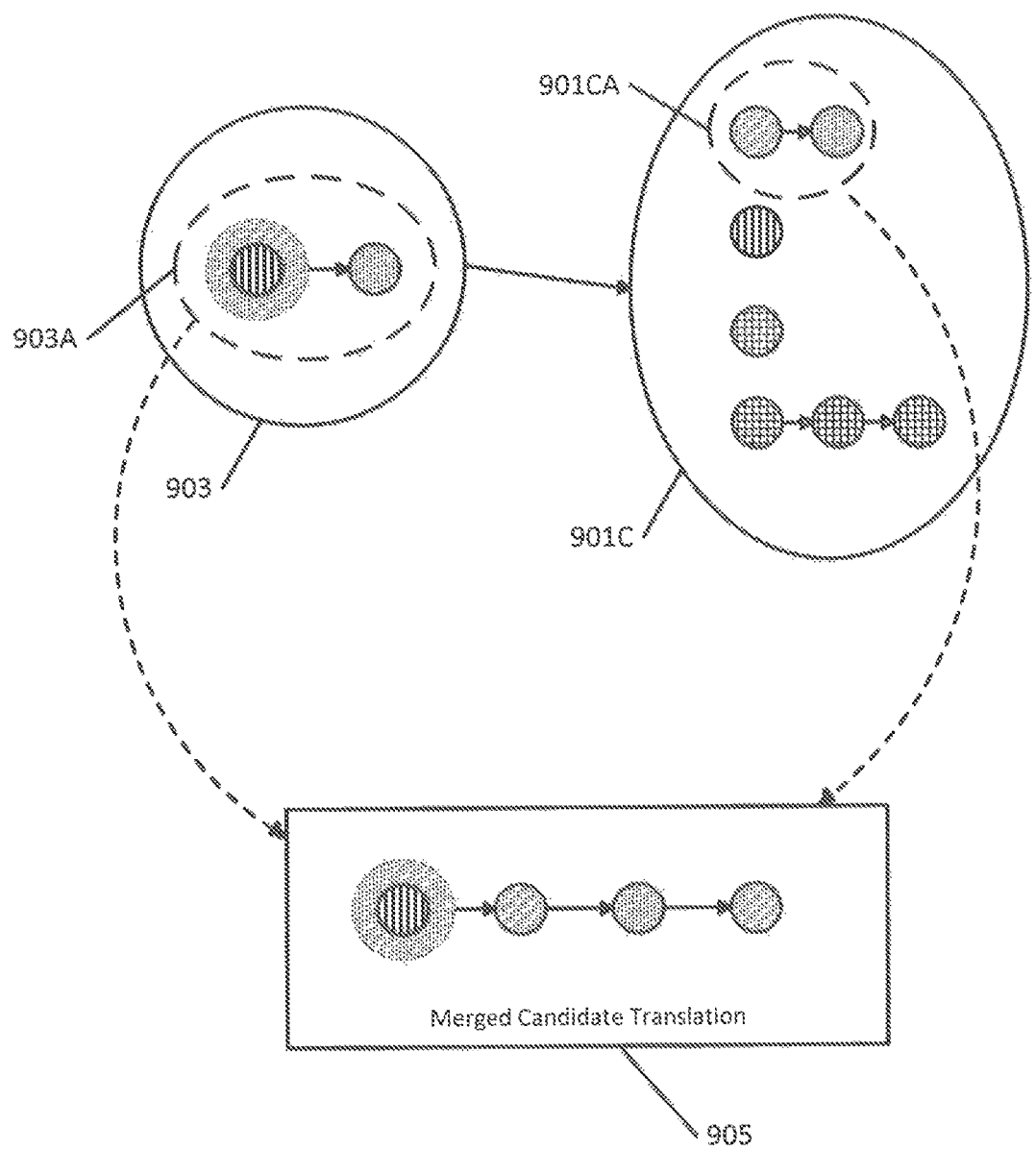
FIG. 9D illustrates the next merge performed between the remaining regions of the job hypergraph shown in FIGS. 9A-9C according to an exemplary embodiment.

FIG. 9D illustrates the next merge performed between the remaining regions of the job hypergraph shown in FIGS. 9A-9C according to an exemplary embodiment. As shown in FIG. 9D, candidate translation 903A in region 903 is merged with candidate translation 901CA in region 901C. As indicated by the merged candidate translation, 905, this process is straightforward as the available engine for candidate translation 901CA matches the available engine for candidate translation 903A. Therefore, the jobs in candidate translation 901CA are appended to the end of candidate translation 903A, resulting in merged candidate translation 905.

Figure 9E:
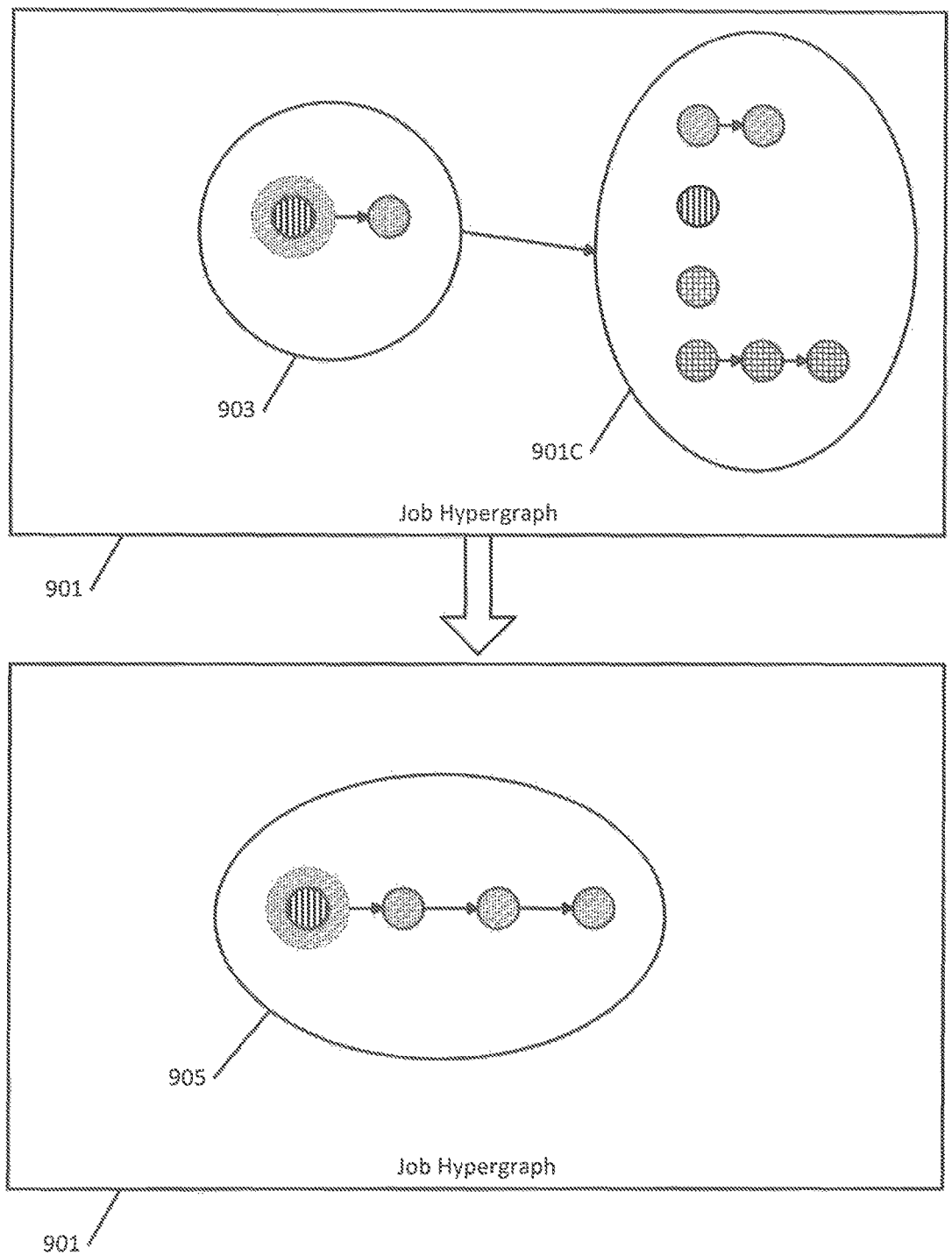
FIG. 9E illustrate the second iteration of the process of replacing the pair of merged regions in the job hypergraph with a single merged region which includes the merged candidate translation according to an exemplary embodiment.

FIG. 9E illustrate the second iteration of the process of replacing the pair of merged regions in the job hypergraph with a single merged region which includes the merged candidate translation according to an exemplary embodiment. As shown in FIG. 9E, regions 903 and 901C in the job hypergraph are replaced with merged region 905. Since there are no additional pairs of connected regions in the hypergraph and only one merged candidate translation in this merged region 905, the process is complete and the merged candidate translation can be designated as the alternative job graph.

Figure 10:
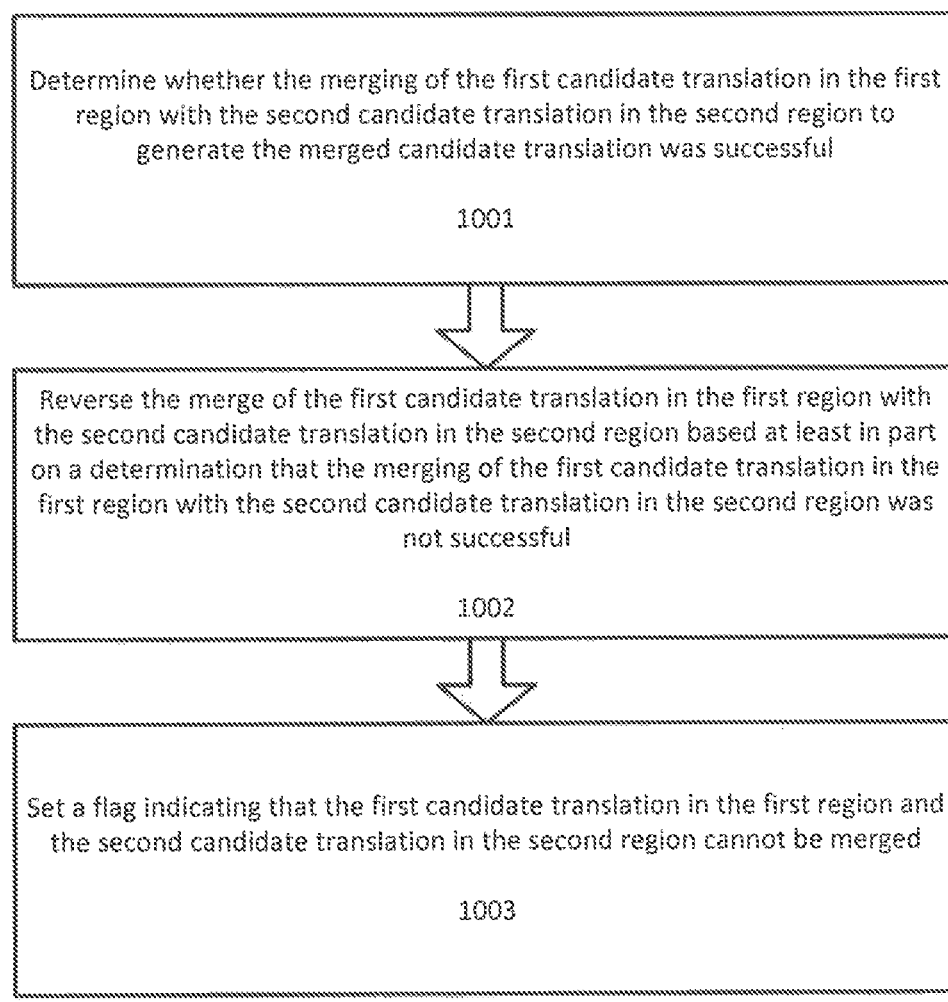
FIG. 10 illustrates another flowchart for condensing the job hypergraph into an alternative job graph by iteratively replacing each pair of connected regions with a merged region comprising a merged candidate translation generated by combining a pair of candidate translations in that pair of connected regions according to an exemplary embodiment.

FIG. 10 illustrates another flowchart for condensing the job hypergraph into an alternative job graph by iteratively replacing each pair of connected regions with a merged region comprising a merged candidate translation generated by combining a pair of candidate translations in that pair of connected regions according to an exemplary embodiment. The process shown in FIG. 10 can be part of the condensing process shown in FIG. 8.

At step 1001 it is determined whether the merging of the first candidate translation in the first region with the second candidate translation in the second region to generate the merged candidate translation was successful. This step corresponds to step 804 in FIG. 8. As discussed earlier, this determination can be based on the output provided by the merge function and/or based on a determination made by the driver. For example, the driver can determine that the merge was successful if the merge function provides a merged translation and determine that the merge was unsuccessful is the merge function indicates a failure to merge. Additionally, the driver can determine that the merge was unsuccessful if it is unable to locate or create a suitable merge function or if it determines that the merged translation is not acceptable based upon one or more driver specific rules.

At step 1002 the merge of the first candidate translation in the first region with the second candidate translation in the second region is reversed based at least in part on a determination that the merging of the first candidate translation in the first region with the second candidate translation in the second region was not successful. If the merge is able to be executed but is deemed unsuccessful based upon some logic in the driver, then this step can include undoing the creation of a merged candidate translation and separating out the component candidate translations into their respective regions. Alternatively, if the merge is deemed unsuccessful because no merge function exists or the only merge functions are not successfully executed, then this step would not require undoing the creation of a merged candidate translation and could be implemented by changing a flag or other variable corresponding to the particular merge to indicate that the merge has been reversed.

At step 1003 a flag is set indicating that the first candidate translation in the first region and the second candidate translation in the second region cannot be merged. As used herein, the term "flag" can mean an explicit flag, such as a Boolean value which stores a true or false state. The term "flag" can also mean an implicit flag which is the result of a particular traversal order, such that the non-selection of a particular element in a set of elements is effectively a flag to not select that element, since the traversal order will not cover that particular element again. In the case of an explicit flag, this flag can be set by the driver so that the attempted merge between the two candidate translations is not repeated. Optionally, the flag can also be persistent across the translations of different programs, meaning that the driver can mark certain candidate translations as being incompatible with other candidate translation, even when an alternative implementation of a different program is being generated. Additionally, while the term flag is frequently used to designate the possibility of a particular merge between candidate implementations, it is understood that the flag can also take into account the particular hypergraph and the sequence of previous merges. In other words, a merge that was not possible at first (where the flag would be set to indicate that the regions cannot be merged), could subsequently become possible after the hypergraph has changed via one or more other merges.

Figure 11:
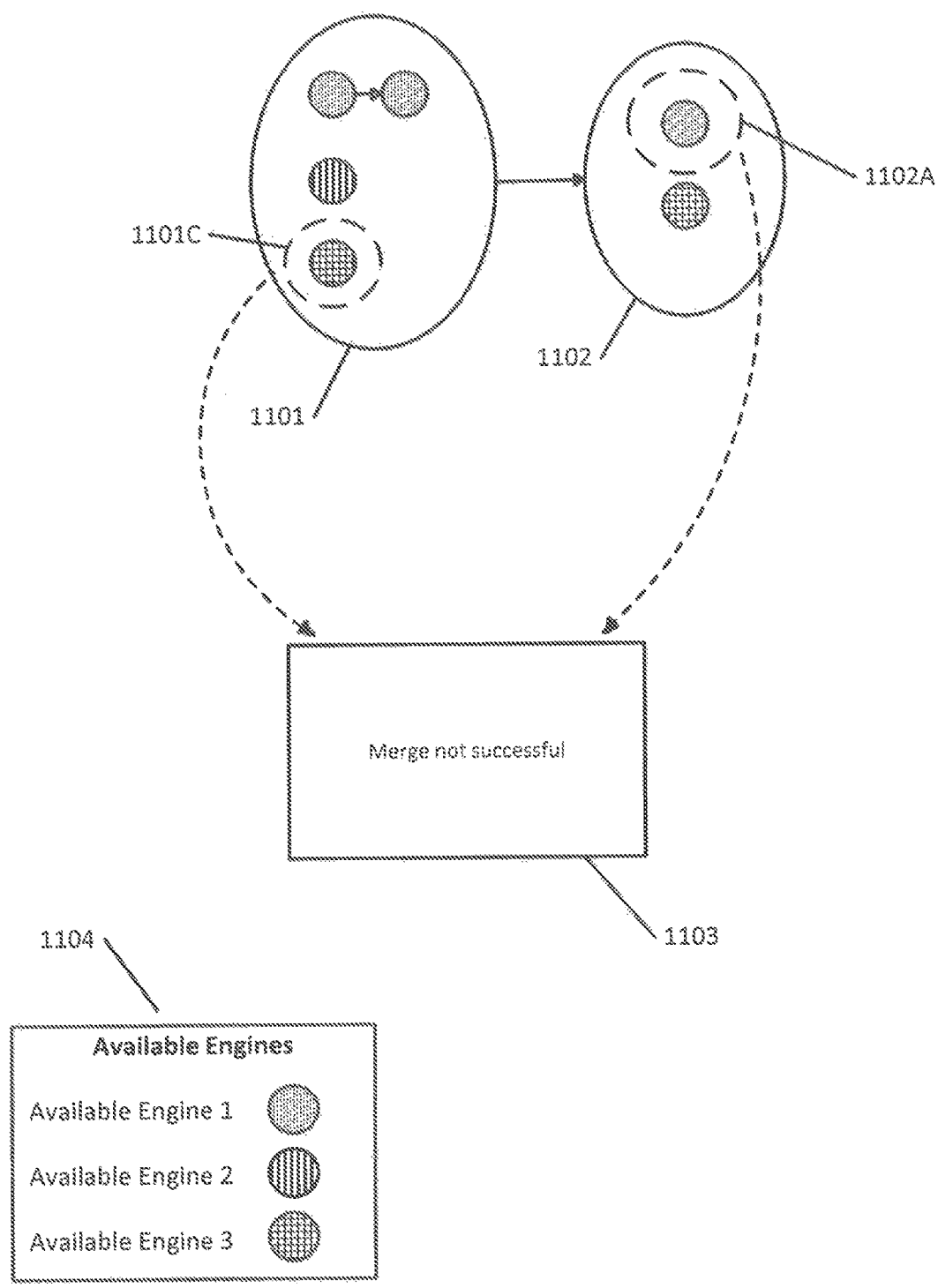
FIG. 11 illustrates an example of a merge attempt that is unsuccessful according to an exemplary embodiment.

FIG. 11 illustrates an example of a merge attempt that is unsuccessful according to an exemplary embodiment. The illustrated merge attempts to merge candidate translation 1101C in region 1101 with candidate translation 1102A in region 1102. As shown in box 1103, no merged candidate translation is generated because the merge was not successful. In this case, any flags or variables associated with the merge can be set to indicate that the merge was reversed. Additionally, another flag corresponding to a link between candidate translation 1101C and candidate translation 1102A can be set to indicate that no merge is possible between these two candidate translations.

The actual process of merging candidate translations in pairs of connected regions of the hypergraph is not performed by the driver but rather by "merge functions," also referred to as "mergers." Merge functions are components of the Flex framework which take the output of one candidate translation (the output of a first job graph), the input of another candidate translation (the input of a second job graph which is connected to the first job graph) and return a single job graph, referred to as a merged translation, that represents some legal combination of the two. Just as with translators, there may be multiple legal ways to reconfigure the job logic to accomplish this goal. For example, in Spark translation it's usually possible to combine two adjacent spark programs by simply directly connecting the output of one to the input of the other, but it's also possible to simply terminate the earlier program by dumping its data to disk, then starting the downstream program by reading from that staging point. In the former case two jobs merge into one, but in the latter they remain distinct entities—this is an important property of mergers, because in some situations single-job or multi job mergers may not be possible.

Mergers operate on input/output handles of given candidate translations (job graphs) and each handle corresponds to the input/output of a single job. Although mergers can optionally investigate the other jobs within a particular job graph, this significantly reduces the generality of the merger. Mergers can be implemented in software (such as by merge functions), hardware, or some combination of the two.

Figure 12:
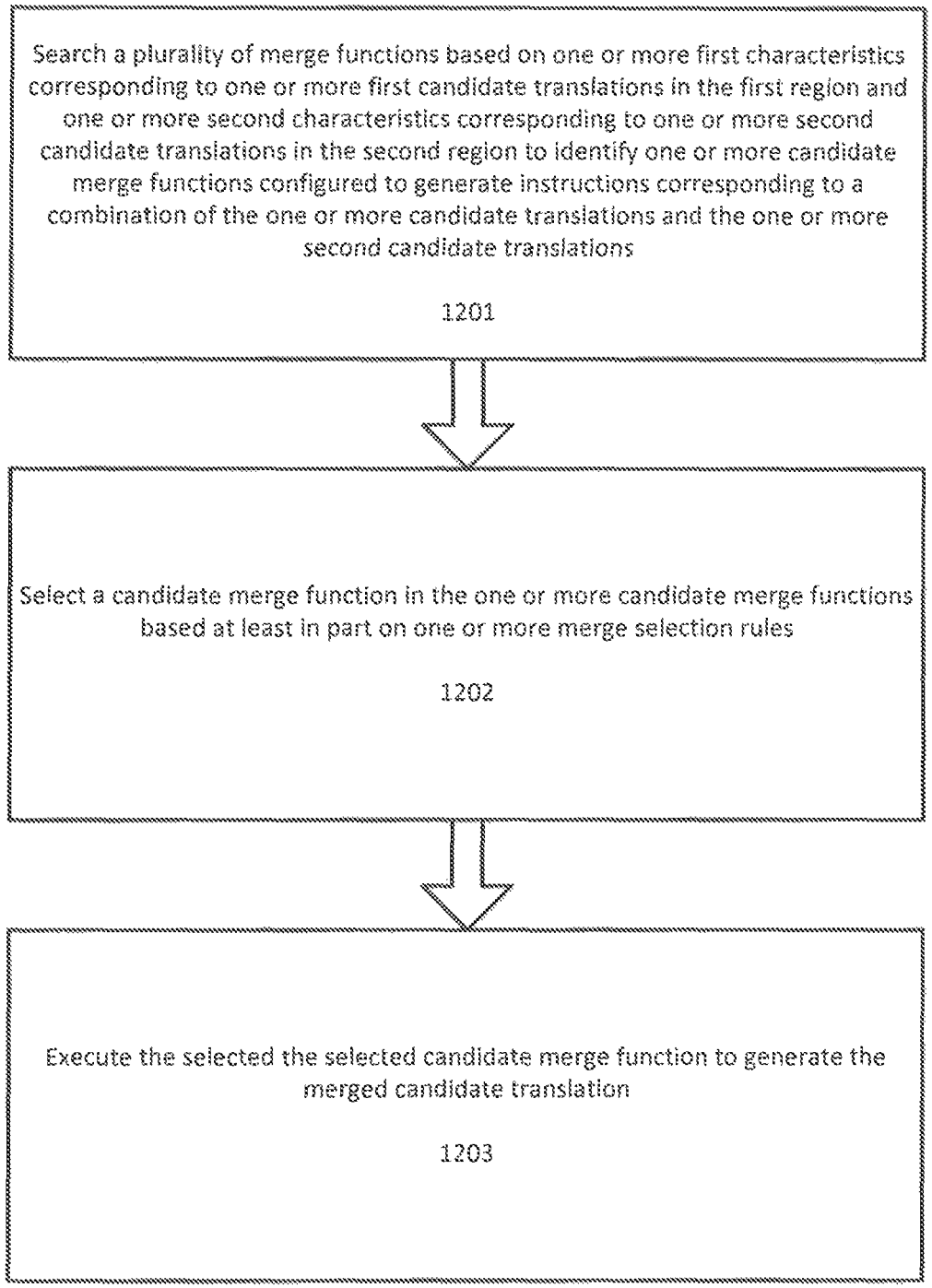
FIG. 12 illustrates a flow chart for merging the first candidate translation in the first region with the second candidate translation in the second region to generate the merged candidate translation according to an exemplary embodiment.

FIG. 12 illustrates a flow chart for merging the first candidate translation in the first region with the second candidate translation in the second region to generate the merged candidate translation according to an exemplary embodiment.

At step 1201 a plurality of merge functions are searched using one or more first characteristics corresponding to one or more first candidate translations in the first region and one or more second characteristics corresponding to one or more second candidate translations in the second region to identify one or more candidate merge functions. The characteristics can include, for example, the engine used by a particular job in a candidate translation, the output state or format of a particular job in a candidate translation, the input state or format of a particular job in a candidate translation, a job input or output handle, or an identifier of a particular job or jobs in a candidate translation. As discussed earlier, the first characteristics can correspond to output handles of the last jobs in the first candidate translations and the second characteristics can correspond to input handles of the initial jobs in the second candidate translations. The one or more candidate merge functions configured to generate instructions corresponding to one or more combinations of one or more first candidate translations and one or more second candidate translations. The plurality of merge functions can be stored in a merge function library which is accessible and/or searchable by the driver.

At step 1202 a candidate merge function in the one or more candidate merge functions based at least in part on one or more merge selection rules. Merge selection rules can govern which merge functions (and which candidate translations) are selected and can be based on relevant factors such as the available engine for each of the translations, ability or feasibility of linking the translations, or any other custom criteria defined for a particular implementation.

At step 1203 the selected candidate merge function is executed to generate the merged candidate translation. If the selected candidate merge function is not successful and there are other candidate merge functions, then optionally steps 1202-1203 can be repeated to select and execute another candidate merge function.

The driver or some other component of the Flex framework can also be used to generate a merge function for linking two jobs within two candidate translations when a relevant merge function does not exist.

Figure 13:
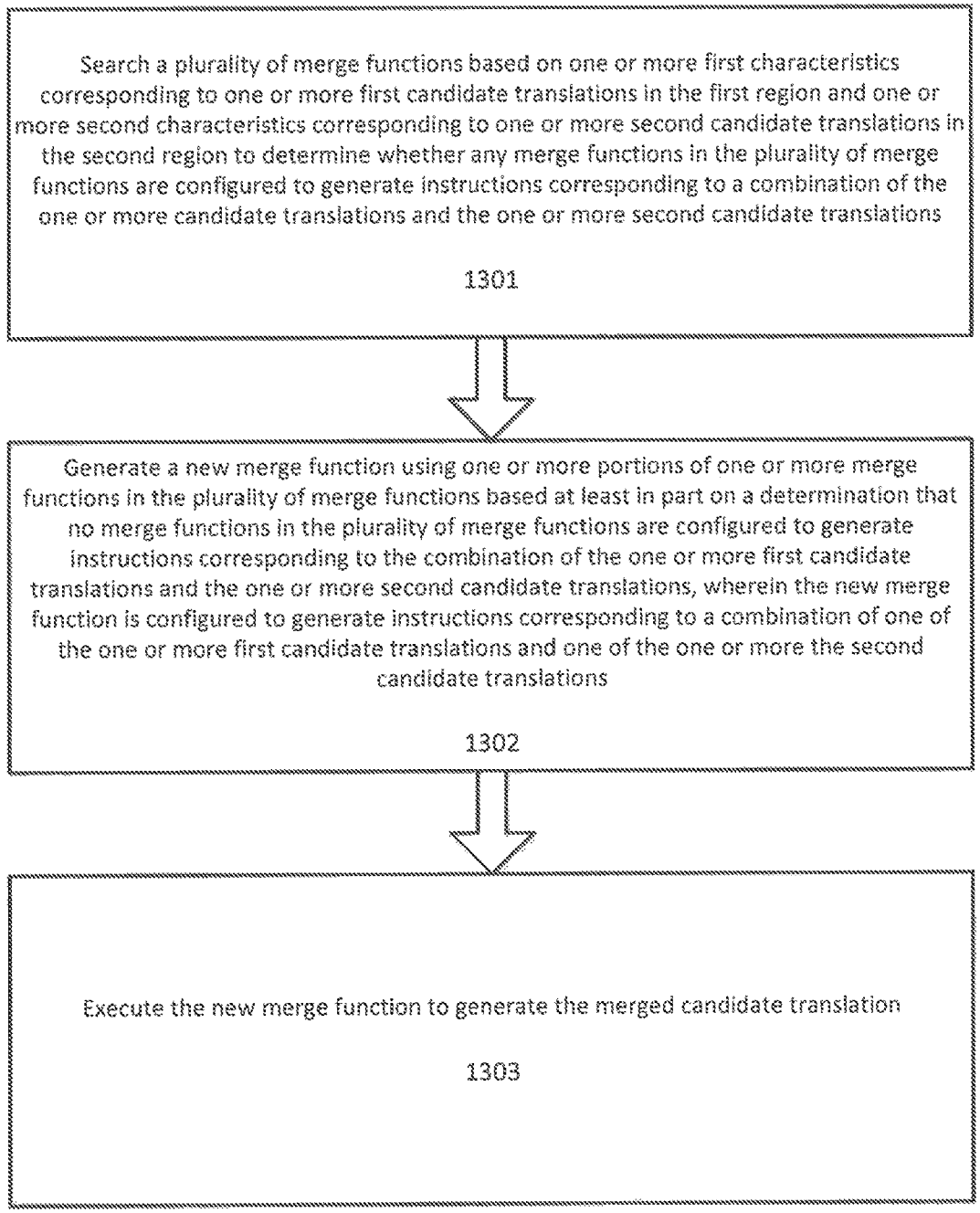
FIG. 13 illustrates a flow chart for merging the first candidate translation in the first region with the second candidate translation in the second region to generate the merged candidate translation when merge functions are required to be generated according to an exemplary embodiment.

FIG. 13 illustrates a flow chart for merging the first candidate translation in the first region with the second candidate translation in the second region to generate the merged candidate translation when merge functions are required to be generated according to an exemplary embodiment.

At step 1301 a plurality of merge functions using one or more first identifiers corresponding to one or more first candidate translations in the first region and one or more second identifiers corresponding to one or more second candidate translations in the second region to determine whether any merge functions in the plurality of merge functions are configured to generate instructions corresponding to a combination of the one or more first candidate translations and the one or more second candidate translations.

At step 1302 a new merge function using one or more portions of one or more merge functions in the plurality of merge functions based at least in part on a determination that no merge functions in the plurality of merge functions are configured to generate instructions corresponding to the combination of the one or more first candidate translations and the one or more second candidate translations. The new merge function is configured to generate instructions corresponding to a combination of one of the one or more first candidate translations and one of the one or more second candidate translations.

The merger logic for the new merge functions can be generated based on one or more merger construction rules and the characteristics of the engine of the last job in the first candidate translation and the engine of first job in the second candidate translation. For example, in certain situations, the merge function can convert the output from a format used by the engine of the last job in the first candidate translation into a format which is acceptable to the engine of first job in the second candidate translation. In this case, the merger construction rules can specify which adjustments are necessary depending on the source engine and the destination engine and the new merge function can be saved to a merger library for reusability.

At step 1303 the new merge function is executed to generate the merged candidate translation. In the event that the new merge function is unsuccessful in producing a merged candidate translation, the created function can be marked as non-functional and steps 1302-1303 can optionally be repeated to generate a new merge function.

The processes shown in FIGS. 12-13 can be performed by a sub-component of the driver called the "merger provider." The merger provider can be a software function or hardware implemented logic which, given connected output and input job graphs (the two candidate translations in the connected regions), returns a list of candidate merge functions to the driver. The merger provider abstracts the process of locating or generating the merge functions, making it possible to apply the same driver intelligence in multiple contexts without needing to inspect job or job graph state. As with other aspects of the driver, the merger provider API is an extension point.

Figure 14:
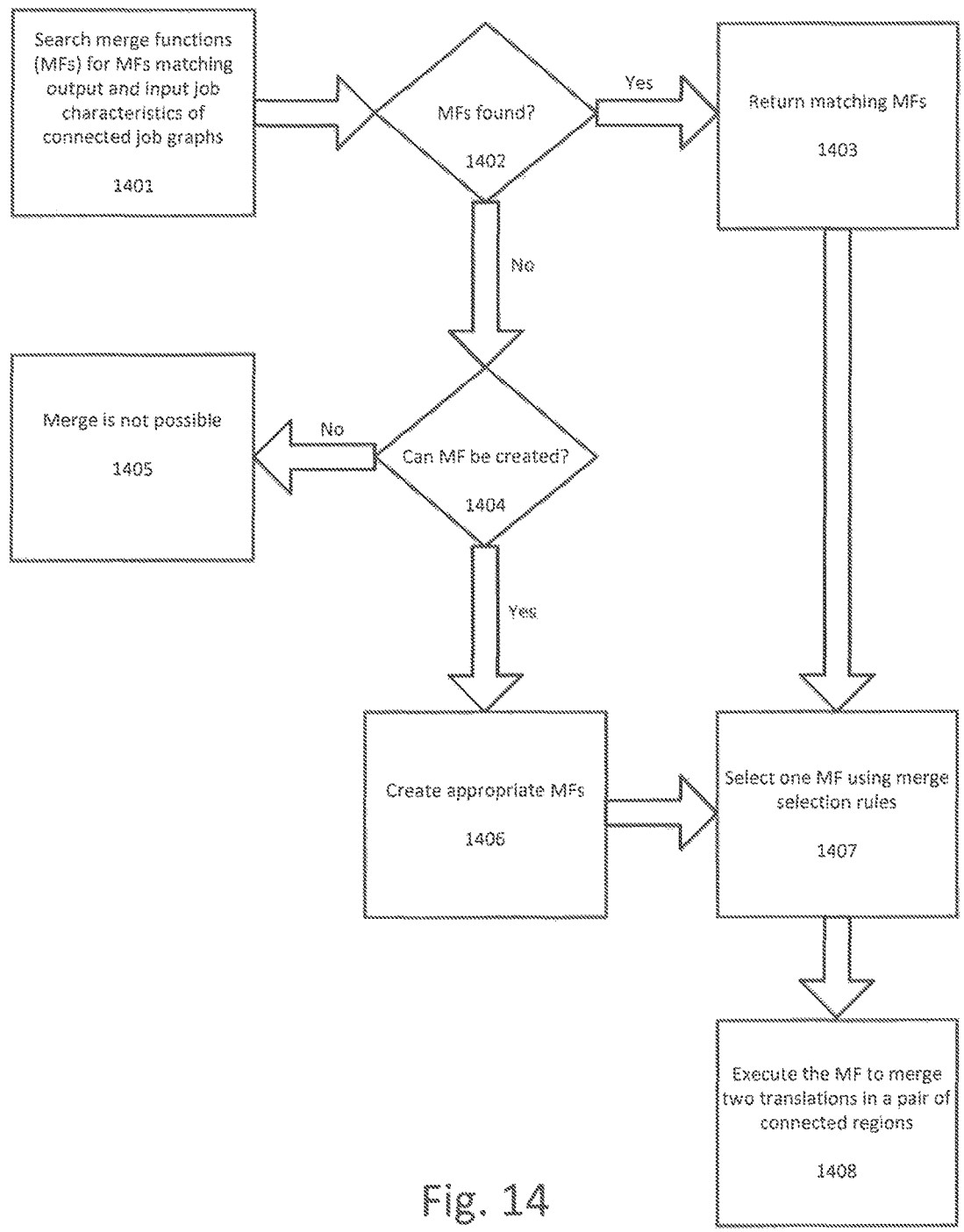
FIG. 14 illustrates a process flow diagram for merging a first candidate translation in a first region of the hypergraph with a second candidate translation in a second region of the hypergraph which is connected to the first region to generate the merged candidate translation according to an exemplary embodiment.

Of course, the processes shown in FIGS. 12-13 can be implemented simultaneously. FIG. 14 illustrates a process flow diagram for merging a first candidate translation in a first region of the hypergraph with a second candidate translation in a second region of the hypergraph which is connected to the first region to generate the merged candidate translation according to an exemplary embodiment.

At step 1401 the merge functions (such as merge functions stored in a library or database) are searched for merge functions matching output and input job handles of connected job graphs, corresponding to the two candidate translation in the connected regions of the job hypergraph. At step 1402 a determination is made regarding whether matching merge functions have been found. If so, the matching merge functions are returned at step 1403. If not, then a determination is made regarding whether a merge function can be generated at step 1404. This determination can be based upon an analysis of one or more merger generation rules, the engines for the output/input jobs, and optionally, additionally driver specific logic regarding the characteristics of the jobs. If a merge function cannot be generated then at step 1405 the system determines that a merge is not possible. Otherwise, one or more merge functions are generated at step 1406. At step 1407 merge selection rules are used to select one of the merge functions found through the search or generated. These merge selection rules can alternatively be used during the search and/or generation steps rather than being applied as a separate step. At step 1408 the selected merge function is executed to merge the two translations in the pair of connected regions of the hypergraph.

Of course, FIG. 14 is presented by way of example only, and many variations are possible. For example, it is not necessary that a search be conducted for merge functions prior to generating a suitable merge function. The merger provider component of the driver may automatically generate suitable merge functions, look up merge functions, or perform any other functionality which results in a merge function being provided to merge two candidate translations (two job graphs) into a single merged translation.

Figure 15:
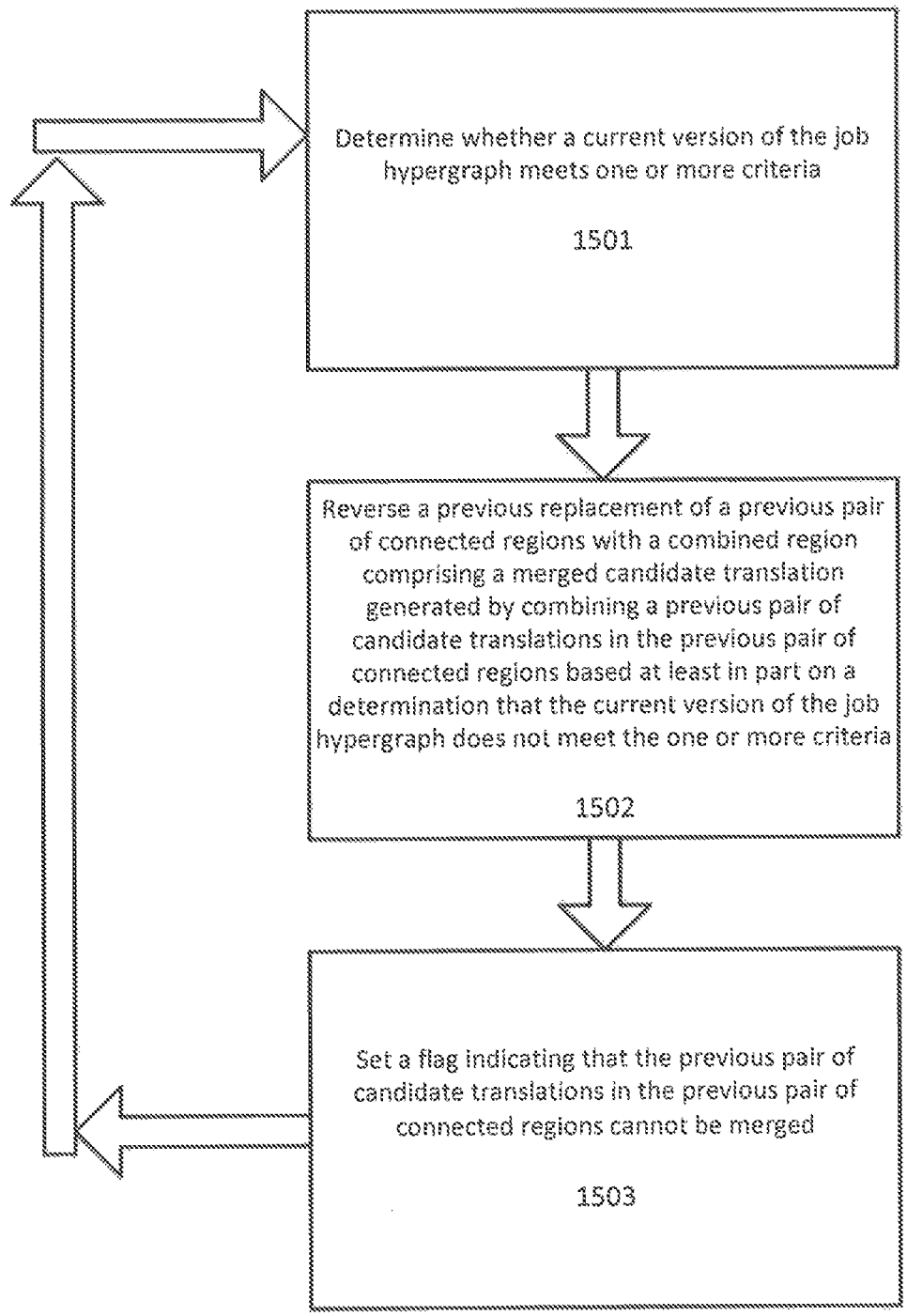
FIG. 15 illustrates a flowchart for reversing previous merges when condensing the job hypergraph into an alternative job graph by iteratively replacing each pair of connected regions with a merged region comprising a merged candidate translation generated by combining a pair of candidate translations in that pair of connected regions according to an exemplary embodiment.

The process of condensing the job hypergraph can also allow for moving backwards within the merge space when a particular solution leads to a dead end or is undesirable according to the particulars of the driver logic. FIG. 15 illustrates a flowchart for reversing previous merges when condensing the job hypergraph into an alternative job graph by iteratively replacing each pair of connected regions with a merged region comprising a merged candidate translation generated by combining a pair of candidate translations in that pair of connected regions according to an exemplary embodiment.

At step 1501 it is determined whether a current version of the job hypergraph meets one or more criteria. The current version can be any intermediate version of the job hypergraph prior to the final version or can be the final version of the job hypergraph which is generated after all pairs of regions have been merged. In the latter scenario, this step serves to ensure that the alternative implementation meets certain driver-specific criteria prior to generation. For example, a number of merges may be successfully performed which link various regions of the job hypergraph, but the resulting alternate job graph may be computationally expensive or otherwise undesirable. In this case, the final version of the job hypergraph may be determined to not meet certain criteria, which can include algorithmic complexity, number of steps, or any other performance based criteria. This evaluation of performance characteristics can also be performed prior to the current version, based on the regions of the hypergraph which have been merged.

When evaluating whether the alternative job graph is complete and can be used to generate an alternative implementation, the criteria for can include determining (1) whether every link between jobs has been successfully merged (every link has a successful merge strategy associated with it), and (2) determining whether each region in the hypergraph has exactly one candidate translation. In other words, the criteria can include determining that all of the regions have been consolidated into a single region, that the one region has exactly one candidate translation, and that all the jobs in the one candidate translation can be merged.

Additionally, if the current version of the job hypergraph is an intermediate version, the criteria can include an evaluation of remaining merge options to determine whether the remaining merges are feasible or desirable. For example, after a series of successful merges the job hypergraph may reach a point where it is not possible to merge any remaining connected pairs of regions. This would lead to the current version of the job hypergraph not meeting a basic criteria of being able to find a solution which generates an alternative implementation of the program.

At step 1502 a previous replacement of a previous pair of connected regions with a merged region comprising a merged candidate translation generated by combining a previous pair of candidate translations in the previous pair of connected regions is reversed based at least in part on a determination that the current version of the job hypergraph does not meet the one or more criteria. This step effectively walks the job hypergraph backwards to an earlier, less-merged state and is one of the many improvements of the flex framework over previous pushdown systems. The flex framework efficiently removes old merges and adds new merges with near constant runtime, which allows for efficient traversal of the search space of possible merges. This is different than the previously discussed reversal of merging because in this case the reversal is not the result of a failure to merge or an unsuccessful merge attempt, but rather because the job hypergraph has failed to meet the one or more criteria, which can include driver specific parameters and requirements.

At step 1503 a flag is set indicating that the previous pair of candidate translations in the previous pair of connected regions cannot be merged. As discussed earlier, the flag can be explicit or implicit. In the case of an implicit flag, after reversing the merge of the previous pair of connected regions, the remaining traversal options in the search space will not include the previous pair of connected regions. In the case of an explicit flag, this allows the driver to explore alternative merging options without repeating the sequence of merges which led to the current version of the job hypergraph not meeting the one or more criteria.

After steps 1501-1503 have been executed, they can then be repeated until the current version of the job hypergraph meets the one or more criteria. For example, it may not be sufficient to roll back the hypergraph to the state it was in prior to the previous merge. It may be necessary to reverse multiple merges in order to reach a state which meets the one or more criteria. Certain merge decisions may lead to dead-ends which do not become evident until multiple subsequent merges are performed, at which point it would be necessary to restore the job hypergraph to the state it was in before those merge decisions were made.

Returning to FIG. 1, at step 105 an alternative implementation of the program is generated based at least in part on the alternative job graph. The alternative implementation can be generated by mapping the job identifiers for the jobs in the alternative job graph to the corresponding operations. For example, a lookup can performed in a job database which retrieves the operations corresponding to each job identifier and which organizes the instructions in the sequence specified by the alternative job graph. The jobs generated as part of the merging steps used to determine the alternative job graph will also be converted into the appropriate sequences of operations.

As shown in FIG. 9B, a job can have operations configured to execute on an engine which is different that the engine that the job itself is configured to execute on. For example, if the merged candidate translation 903 shown in FIG. 9B is used as a job graph to generate the alternative implementation of the program, the instructions corresponding to the first job would be configured for execution using available engine 1 rather than available engine 2, even though the job itself uses some operations configured to execute on available engine 2. This is because the first job in the job graph is configured for execution on available engine 1. In this case, the merger function may have determined that certain operations for available engine 2 can be executed through available engine 1.

The alternative implementation of the program is configured to execute on the one or more available engines. In many situations, the alternative implementation will be configured to execute on multiple available engines. This is a significant advantage over other pushdown systems which allow only for execution on a single engine. The Flex framework allows users to simultaneously compare candidate executions, even if the candidates span across different engines.

Figure 16C:
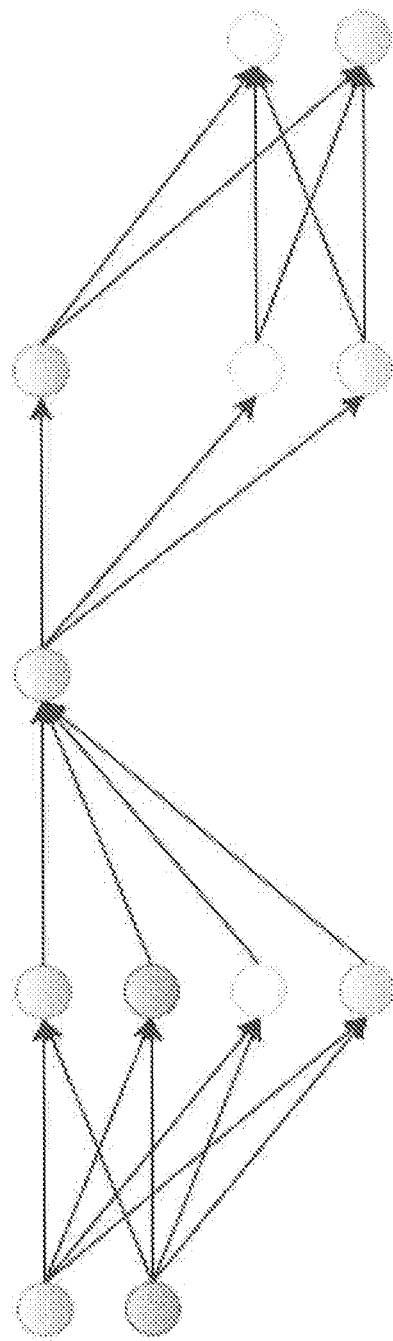
Figure 16C:
Figure 17C:
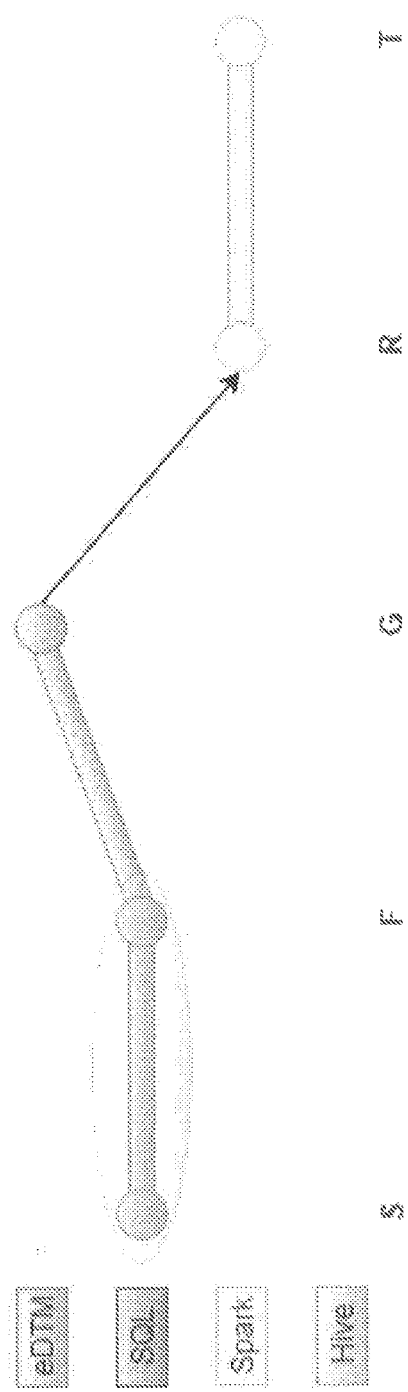
Figure 17D:
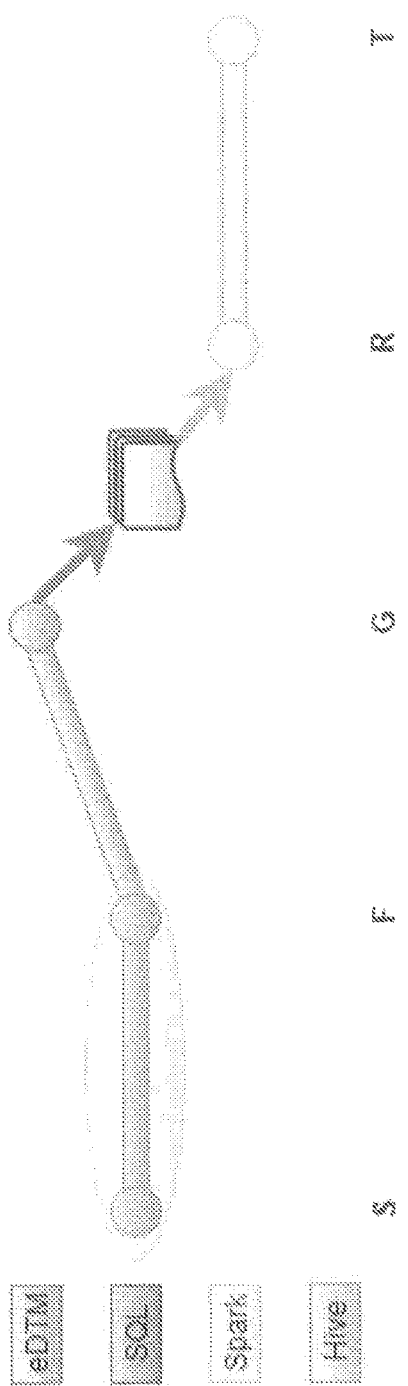

FIGS. 16A-16C illustrate an example of the translation of jobs in a job graph into a job hypergraph according to an exemplary embodiment. FIG. 16A illustrates a job graph comprising five jobs: relational source, filter, stateful generic, rank, and hive target. Assuming that the available engines include eDTM, SQL, Spark, and Hive, FIG. 16B illustrates the candidate translations which are available for each of the five jobs on the available engines. For example, the hive target job only has translations available in Spark and Hive, whereas the filter job has translations in all of the available engines. Each of the columns shown in FIG. 16B corresponds to a region in a hypergraph of regions. For example, the region corresponding to the relational source command includes two candidate translations.

The candidate translations in FIG. 16B are generated by the Flex framework by locating and applying translators for each engine/transformation combination. Each of the translations to the available engines are discussed in greater detail below.

Translating to eDTM: Since transformations are already operations in the eDTM's domain, it is not necessary to translate them in any way and almost all of them are supportable. The one exception is Hive target—that operation cannot be executed by the eDTM.

Translating to SQL: Translating the relational source to SQL is straightforward. The result is a SQL Abstract Syntax Tree (AST)—after translation is complete the original transaction can be removed. Translating the filter to SQL is also straightforward, but the FROM clause in the translated AST is a placeholder or blank. This is because it cannot have anything to do with the state from the source, as there's a very good chance that translation hasn't even happened yet. The other 3 jobs cannot be translated to SQL.

Translating to Spark: While translating the relational source to Spark may be possible, for the purpose of this example we assume settings in the transaction logic are incompatible. The filter is easy to translate. The generic job may ordinarily be translatable through the hive bridge if it was stateless, but stateful transactions do not translate. The rank job is supported through Spark's rank utilities and the hive target can be supported via the hive bridge (a compatibility module configured to convert Hive translations into wrapped Spark-on-Hive translation). Although only one spark translation is shown in the diagram, the spark-hive bridge can also usually contribute another, resulting in two candidate Spark translations.

Translating to Hive: The translations to Hive are performed in the same way as the translations to Spark. However, Hive does not have Spark's rank utilities.

Once a complete collection of execution options for all of the mapping elements on all of the available engines is determined, it is necessary to (1) select the most attractive execution strategy for each job, and (2) decide on a strategy to move data between jobs.

FIG. 16C illustrates all of the possible choices for implementation alternatives. Each arrow in FIG. 16C represents a strategy for moving data from the output of the job on the left to the input of the job on the right. Importantly, any path from a left-most circle to a right-most circle is a valid execution of the original mapping. Furthermore, note that each arrow in FIG. 16C can have multiple possible implementations, or possibly none—this is not known until the search begins and selection of which operations and arrows for the alternative implementation occurs.

As discussed throughout the application, the part of Flex that controls this search process is the driver. It may be as sophisticated or simple as makes sense for its specific application; Flex itself does not provide any Driver intelligence. However, Flex makes it easy to both (1) achieve powerful results even with a naïve Driver, and (2) to easily and significantly improve result quality and search speed.

FIGS. 17A-17D illustrate the generation of an alternative implementation using a sophisticated "smart driver" which incorporates various rules to help direct the process according to an exemplary embodiment.

While the original search space is has many possibilities, simple rules can be applied to cut it down. In particular, an SQL tablescan (the relational source job) is followed by a SQL WHERE (the filter job). As this is an attractive option, the smart driver can select that option. The smart driver will look for ways to combine these states and find three: go through a staging table, use a subquery, or use the same query. It's easy to hardcode the last as the preferred strategy, and since that's legal in this case, the smart driver will do that, resulting in the merger shown in FIG. 17A.

On the other side of the mapping, there's an operation (the target) that can only run on a cluster. Moving data into/out of a cluster is expensive, so as a heuristic the smart driver can decide to expand the borders of the spark region as much as possible. Spark is almost a superset of Hive—in fact it can run Hive queries as a subroutine—so the smart driver biases towards Spark, resulting in the merger shown in FIG. 17B.

To get data from a SQL job to an eDTM job, the smart driver has several options. The smart driver can stage the data to a table (or view), then create a relational source in the eDTM task that reads from that table. But in this case the SQL fits into just one query, so the smart driver decides treat it as the SQL override for a relational source, resulting in the merger shown in FIG. 17C. This is an important example of how domains can blend. In this case the merge operation has returned a single work unit ("job") to the Flex controller ("smart driver"), which claims to run on the eDTM engine, even though internally it's still outsourcing data processing to SQL. Importantly, this demonstrates that inter-engine data transfer does not require explicit staging, and can be very efficient.

Last, the smart driver needs to figure out how to get the output of an eDTM to a spark cluster. While any legal option is on the table, for the purposes of this example, it is assumed that the smart driver stages the data in the Hadoop Distributed File System (HDFS), resulting in the merger shown in FIG. 17D.

This is the smart driver's last opportunity to examine the execution plan. If it decides the plan is acceptable, processing is done. Otherwise, it can back out and try a different strategy. As shown in this example, an overall execution strategy was located in linear time, because no back-outs were necessary.

Figure 18A:
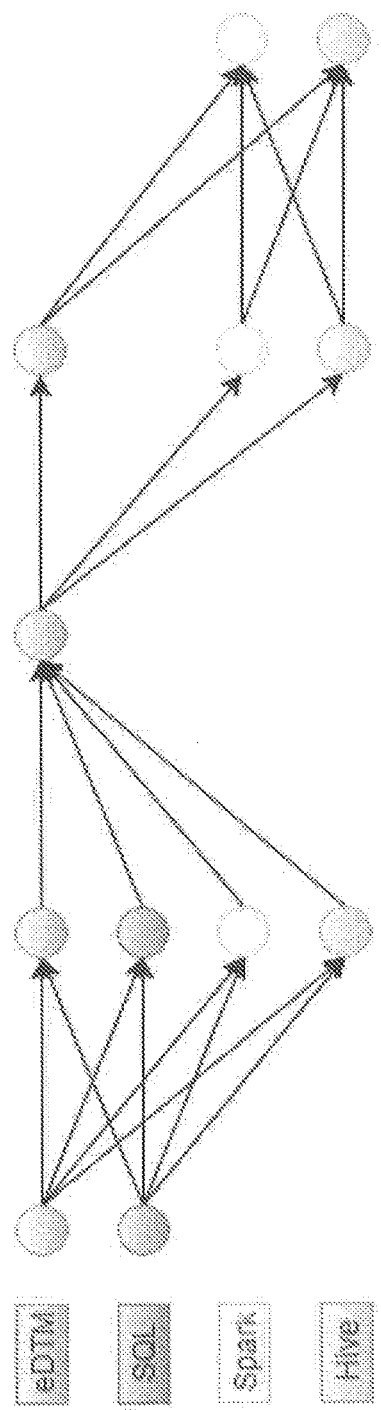
FIGS. 18A-18B illustrate the generation of an alternative implementation using a naïve driver that explores all of its options sequentially and accepts the first complete plan it finds according to an exemplary embodiment.
Figure 18B:
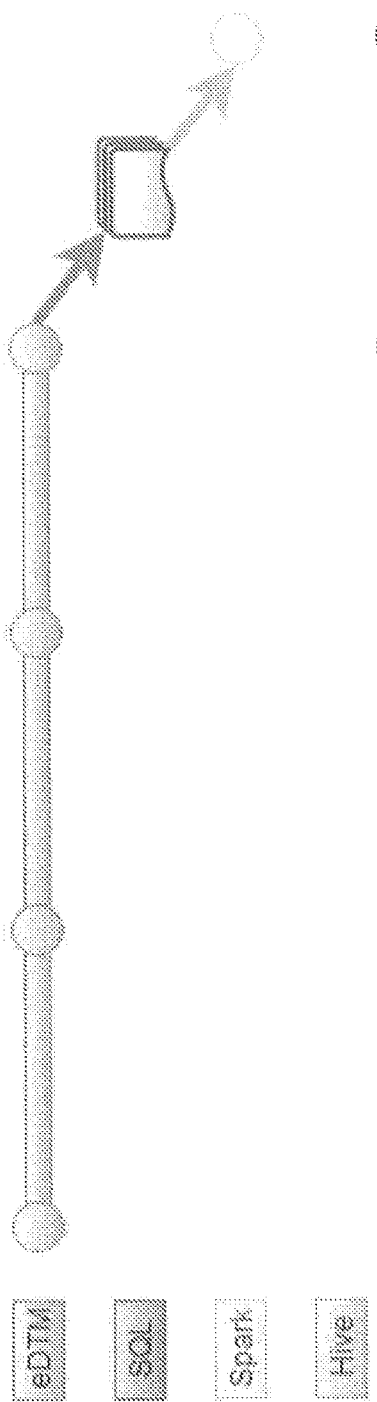
Figure 19A:
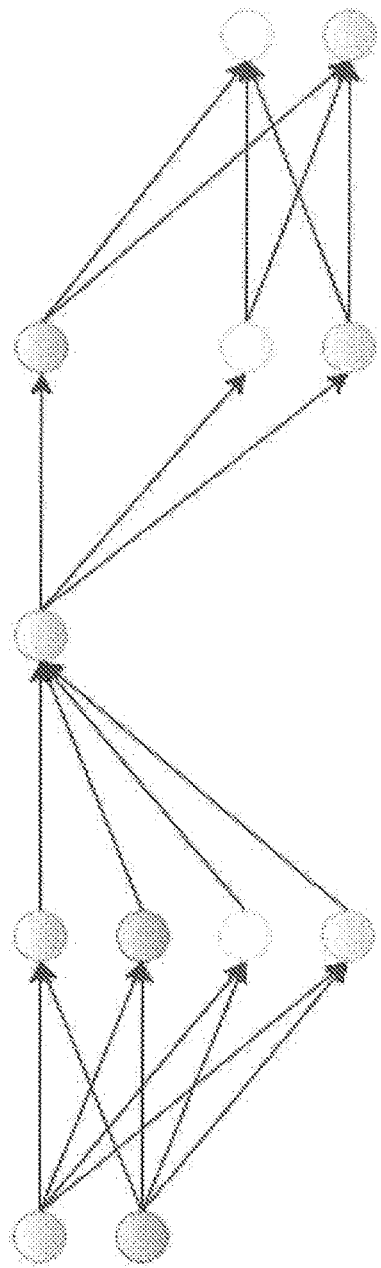
Figure 19B:
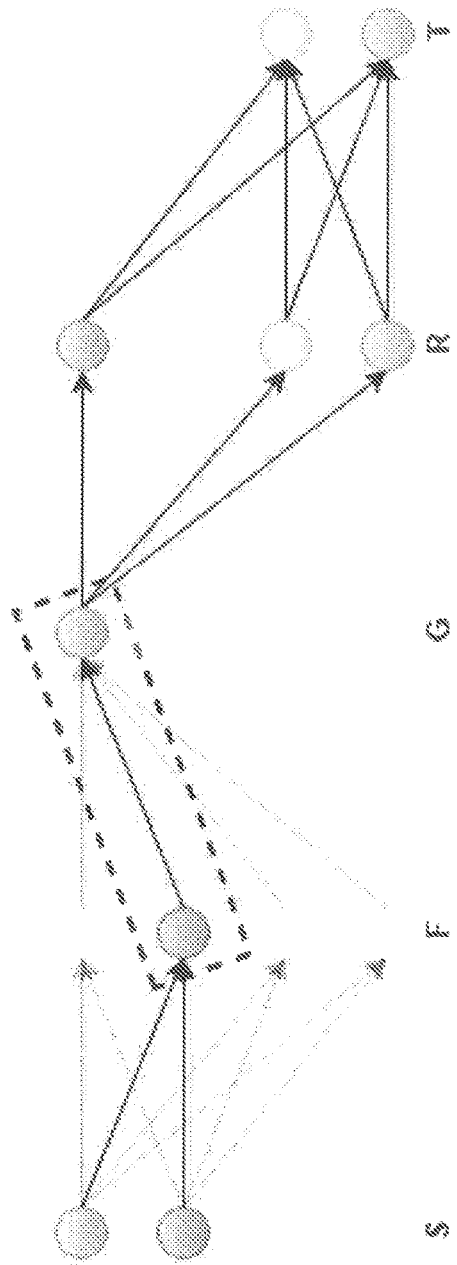
Figure 19G:
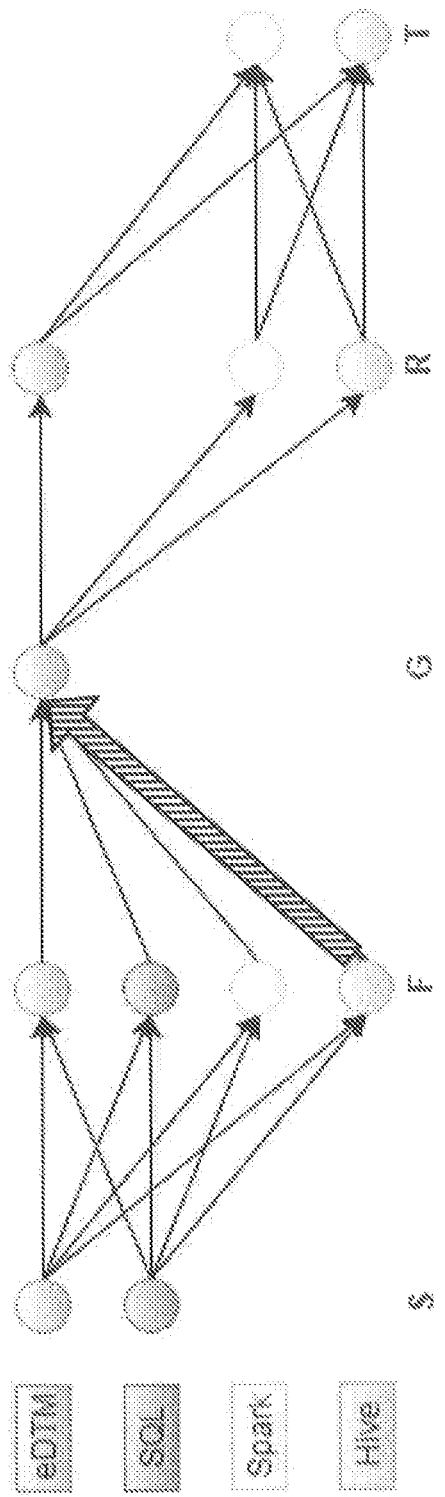

FIGS. 17A-17D used a sophisticated driver to demonstrate the advanced capabilities of the framework. However, the primary advantages of the Flex framework do not come from driver intelligence. Flex can easily manage some capabilities that were previously impossible even with a default naïve driver. To demonstrate this, FIGS. 18A-18B illustrate a naïve driver that explores all of its options sequentially and accepts the first complete plan it finds according to an exemplary embodiment.

FIG. 18A again illustrates the starting point and the possibilities available to the naïve driver. A naïve driver that chose options sequentially would simply try to select the first execution strategy for all operations and then see if they merged, using the first merger it could find in all cases. So in this case the naïve driver would select the eDTM strategy for the source, filter, generic tx, and rank, then select Spark for the target. eDTM operations can be merged most easily by just including them in the same mapping (though other merge strategies are possible). Integrating the eDTM-→Spark merger that stages data on HDFS from the previous example, the resulting overall execution strategy is shown in FIG. 18B. This strategy is correct, although very sub-optimal. Additionally, this execution strategy was also generated in linear time because the first option the naïve driver selected in each case happened to be possible.

The previous examples did not demonstrate the resilience and versatility of the search used in the Flex framework. Additionally, they also did not demonstrate the possibility of the search taking longer than linear time. To illustrate these concepts, FIGS. 19A-19G illustrate an example of a simple and random driver according to an exemplary embodiment.

FIG. 19A again illustrates the starting point and the possibilities available to the simple and random driver. The simple and random driver randomly starts by attempting to merge the filter job with the generic job. The generic job only has one execution option (eDTM), so the simple and random driver selects that. For the filter, the simple and random driver selects SQL, resulting in the attempted merge shown in FIG. 19B.

A similar strategy was employed successfully in FIGS. 17A-17D. The upstream job is a SQL state, and the downstream job is an eDTM, so the simple and random driver will utilize the same "interpret as source pushdown" merger strategy that was used in that example. But this time there's a problem: to refactor a SQL state as a source transaction in a mapping, the SQL state must fit into a single SELECT statement. Even assuming the simple and random driver comes up with a way to represent a partial SQL query in a relational source, there's no way to know that the input to the SQL will be legal. Therefore, the merge fails.

At this point the simple and random driver backs out, and tries another option. The next option attempted by the simple and random driver is Hive's implementation of the filter job, as shown in FIG. 19C.

There's a couple of ways the simple and random driver can make this work, and all of them can be modeled with separate Hive→eDTM Mergers.

First, it could be possible for Hive to send data to eDTM via HDFS (like Spark can), but for the purposes of this example, we assume that this isn't possible. Therefore no such merger exists.

Next, the simple and random driver can try a merger that reinterprets the eDTM as an saDTM and executes it via a TRANSFORM clause. However, since the eDTM in this case is executing a stateful operation, this merge strategy fails. Therefore, while such a merger does exist, it would have to fail.

The last merger the simple and random driver could try would generate a temporary Hive table, write the output of the Hive statement to that, and then read from that in a Hive source in the mapping. In this case, the merge strategy works. Therefore the merger succeeds.

The above example illustrates the division of responsibilities between components of the Flex framework. The simple and random driver has contributed no intelligence; it's simply trying whatever merge strategies it can find. Meanwhile, the mergers contribute only enough intelligence to understand their two inputs. They are reusable, stateless entities, and never understand context or overall strategy. Additionally, the communication between the drivers and mergers can be limited to a single Boolean (although drivers are allowed to use mergers with enhanced APIs at the expense of generality).

Once the simple and random driver has a successful merge, it notifies the merge space, which results in the job hypergraph shown in FIG. 19D. The simple and random driver now consider how to merge the source with the filter. First, the simple and random driver randomly selects the SQL implementation, so the simple and random driver looks for SQL→Hive mergers, as shown in FIG. 19E.

Since there is currently no way to get the data from a raw SQL query to a Hive cluster, this attempted merge fails. That leaves the simple and random driver with the eDTM implementation, so the simple and random driver looks for eDTM→Hive mergers, as shown in FIG. 19F.

At this point, the simple and random driver has a few options. As discussed earlier, for the purpose of this example, we assume that it is not possible for Hive to send data to eDTM via HDFS. Therefore, no such merger exists. The eDTM could be rewritten into an saDTM and run as a TRANSFORM clause or storage handler in the Hive query. For the purposes of this example, we assume there is an error in the source or the configuration of the source is such that this isn't possible. The merger exists, but fails.

Hypothetically, since Hive was able to send the data to the eDTM via a Hive table, the simple and random driver should be able to use the same strategy and just have the eDTM write to a temporary Hive table. However, the eDTM does not support the ability to write to a Hive table—this is the reason the Target couldn't be translated to eDTM. Therefore, no such merger exists.

The simple and random driver has therefore exhausted all options along this branch of the search. It has no choice but to back out the previous action (the Hive→eDTM merge) and try something else. Fortunately, the Flex merge space allows this action to be performed quickly and efficiently.

Since the simple and random driver knows that there is no way to merge from Hive filter to eDTM stateful generic, it can set a flag indicating that these two candidate implementations cannot be merged. This flag is shown as the striped arrow in FIG. 19G. Of course, as discussed earlier, the two candidate implementations may, at some other point in the process after one or more other merges, become merge-able. In this case the flag would be removed (if it is an explicit flag) or the merge possibility would be explored (if it is an implicit flag). The simple and random driver attempts find a legal execution strategy, so it will then try some other option. As shown above, it is the driver's responsibility to remember which options have been tried before. It is also the driver's responsibility to indicate when an overall search has failed.

As illustrated by the examples above, the Flex framework is capable of cross-engine implementations without requiring custom intelligence. All intelligence comes from drivers, translators, mergers, translator providers, and merger providers, all of which can be defined externally and/or independently.

While intelligent drivers can provide gains in computational efficiency within certain domains, they are not necessary. Drivers are responsible only for directing the search. Translators and mergers define what can be done, and drivers use that information to decide what should be done. However, "intelligence" for a driver generally comes in the form of domain-specific knowledge, as shown in FIGS. 17A-17D, and domains can proliferate quickly. Therefore, while smarter drivers can find higher quality solutions faster, dumber drivers are more reliable, easier to write, and easier to reuse in arbitrary contexts.

The examples in the above-mentioned figures also illustrate that the search space grows quickly. For example, FIGS. 17A-17D provided a sequence of merges where an entire branch of the search space turned out to be a dead end. Such a branch could have been arbitrarily deep. Smarter drivers can easily implement a few ways to keep the space small, such as by first merging jobs with only one input or only one output, or by grouping jobs by engine type.

The Flex framework also include protections against temporal cycles in a program (a situation where a job occurs after itself, for example if it required input from one of its own outputs.)

When a job output is connected to a job input, they are "linked." These links deliberately have no semantics. Flex does not know if the jobs communicate through a shared resource and therefore the upstream job must run to completion before the downstream job may start, or if both jobs must be alive at the same time so data may be streamed between them, or if the jobs share no data at all and the link indicates only a temporal relationship. This has consequences for the merge phase, because drivers cannot be assumed to understand job internals, yet they still must not allow a temporal cycle to appear in the program.

Flex reinterprets this problem into a simpler, but less general form: the original job graph has an implicit partial order of job input/output handles, and Flex prevents the introduction of temporal cycles by always requiring that partial order to be preserved. This creates three kinds of situations:

(1) Any merger is acceptable. This is the most common case. This applies whenever neither of the other two apply.

(2) The linked jobs must be merged into the same job. This is true whenever the same job is on both the upstream and downstream side.

(3) The linked Jobs must remain separate. This is true whenever combining the jobs may change the temporal order. Generally speaking, combining the jobs is safe whenever no path between them includes a third job. However, computing and maintaining this knowledge is expensive and complex, so Flex uses a simplification: jobs are permitted to merge into a single job if and only if (the upstream job outputs only to the downstream job or itself) or (the downstream job inputs only from the upstream job or itself). This definition is simple and fast to compute, and is nearly as general as a true solution. It partially breaks in a "sawtooth" topology, where both upstream and downstream jobs happen to link to other unrelated jobs. However, investigating trivial merge sites first is very easy, and almost always simplifies the topology to the point where jobs need not be kept separate.

When the sawtooth loops back on itself, resulting in "bandsaw topology" in which there are no single-output or single-input locations to start the merge, the Flex framework can utilize a "CrossMerge" facility such that whenever any two Jobs (1) use the same engine and are in regions that (2) have no temporal relationship (neither is upstream of the other) and (3) contain only single job graphs, a union can performed on the two Regions and the two jobs can then be combined into one. This is useful in many situations because many merge space sources and targets can be merged into single nodes, thereby eliminating the bandsaw loop.

As discussed throughout this application, the Flex framework provides a number of advantages.

The translation framework is universal, it's a superset of all previous translation framework capabilities—it is also a superset of many other kinds of non-translation optimization as well. The immediate advantage is that it is never necessary to write another framework.

A more significant advantage of the Flex framework is that it is a common platform which allows for simultaneously comparison of candidate executions, even if the candidates span across different engines. This functionality was impossible with prior push down frameworks.

Translation is completely independent of context. This reduces translation routines to pure functions. As a result, translation logic can be reused regardless of directionality and translation logic can be trivially, even automatically recombined or even generated.

Operation composition is handled independently from translation. This makes it easy to write complex merge strategies only once, then programmatically apply and evaluate them in any appropriate context.

Translation and composition is not restricted by the final representation of the translated logic. This not only simplifies those operations, but also allows users to delay strategic implementation decisions.

Execution decisions can be made in whatever order makes most sense, making it possible to significantly accelerate the overall algorithm while producing much better results.

The driver intelligence is easily fragmented into appropriate sub-domains. Previously, traversal decisions always needed to be hardcoded at the framework level, but now it is possible for driver intelligence to be modular.

Multiple validation frameworks are no longer required. Additionally, there is no need for different executors, or contradictory rules for different engine "modes"—e.g. Hive mode, spark mode, native mode, blaze mode, etc. Operations merely occur where they can be handled most efficiently.

Pushdown is no longer divided into "source", "target", or "full"—the exact same code covers all three.

It is now possible, even easy, to efficiently generate a high quality multi-engine runtime workflow. There's no longer any reason to artificially restrict the runtime to a single execution environment.

Figure 20:
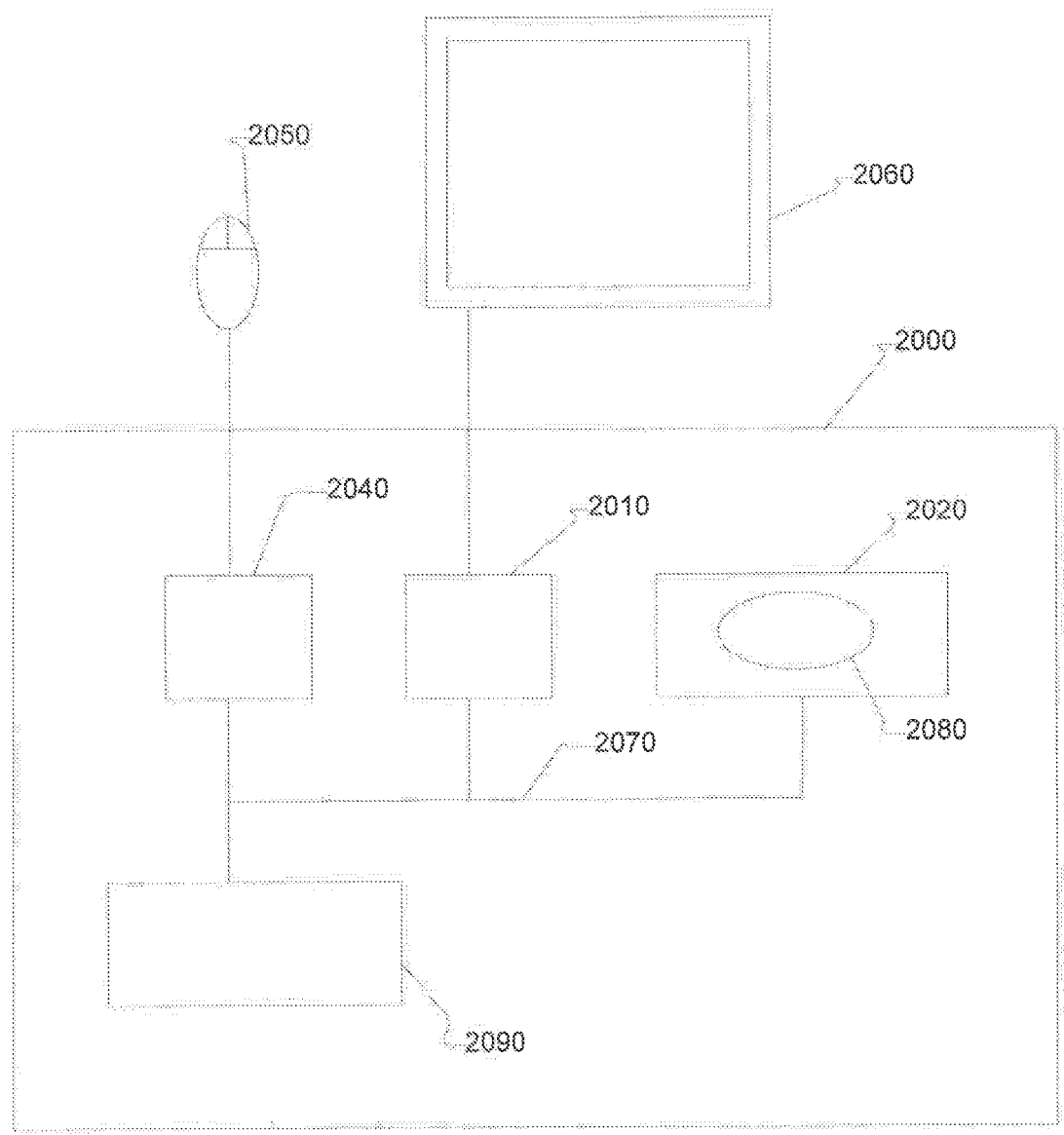
FIG. 20 illustrates an exemplary computing environment that can be used to implement the components of and carry out the method for generating an alternative implementation of a program on one or more engines.

The Flex framework, any components accessed or used by Flex, such as the driver, mergers, translators, or any of the above-described techniques and interfaces can be implemented in or involve one or more computer systems. FIG. 20 illustrates a generalized example of a computing environment 2000. The computing environment 2000 is not intended to suggest any limitation as to scope of use or functionality of a described embodiment.

With reference to FIG. 20, the computing environment 2000 includes at least one processing unit 2010 and memory 2020. The processing unit 2010 executes computer-executable instructions and may be a real or a virtual processor. In a multi-processing system, multiple processing units execute computer-executable instructions to increase processing power. The memory 2020 may be volatile memory (e.g., registers, cache, RAM), non-volatile memory (e.g., ROM, EEPROM, flash memory, etc.), or some combination of the two. The memory 2020 may store software instructions 2080 for implementing the described techniques when executed by one or more processors. Memory 2020 can be one memory device or multiple memory devices.

A computing environment may have additional features. For example, the computing environment 2000 includes storage 2040, one or more input devices 2050, one or more output devices 2060, and one or more communication connections 2090. An interconnection mechanism 2070, such as a bus, controller, or network interconnects the components of the computing environment 2000. Typically, operating system software or firmware (not shown) provides an operating environment for other software executing in the computing environment 2000, and coordinates activities of the components of the computing environment 2000.

The storage 2040 may be removable or non-removable, and includes magnetic disks, magnetic tapes or cassettes, CD-ROMs, CD-RWs, DVDs, or any other medium which can be used to store information and which can be accessed within the computing environment 2000. The storage 2040 may store instructions for the software 2080.

The input device(s) 2050 may be a touch input device such as a keyboard, mouse, pen, trackball, touch screen, or game controller, a voice input device, a scanning device, a digital camera, remote control, or another device that provides input to the computing environment 2000. The output device(s) 2060 may be a display, television, monitor, printer, speaker, or another device that provides output from the computing environment 2000.

The communication connection(s) 2090 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 2000, computer-readable media include memory 2020, storage 2040, communication media, and combinations of any of the above.

Of course, FIG. 20 illustrates computing environment 2000, display device 2060, and input device 2050 as separate devices for ease of identification only. Computing environment 2000, display device 2060, and input device 2050 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 2000 may be a set-top box, mobile device, personal computer, or one or more servers, for example a farm of networked servers, a clustered server environment, or a cloud network of computing devices.

The Flex framework, any components accessed or used by Flex, such as the driver, mergers, translators, the merge space, the merger provider, the translator provider or any of the above-described techniques and interfaces need not be implemented in software code, but instead can be hardcoded into, for example, FPGAs, ASIC chips, customized processors, Stretch microprocessors, DSP chips, ARM processors, microprocessors, system on a chip based devices and the like.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the disclosure and equivalents thereto.

We claim:

1. A method executed by one or more computing devices for generating an alternative implementation of a program on one or more engines, the method comprising:

receiving, by at least one of the one or more computing devices executing the method, a job graph comprising a sequence of connected jobs corresponding to an implementation of the program, each job corresponding to one or more operations in the program;

translating, by at least one of the one or more computing devices executing the method, each job in the job graph into a set of candidate translations corresponding to that job based at least in part on one or more available engines, wherein each available engine comprises an available execution environment for that job and wherein each candidate translation comprises a translation of the one or more operations corresponding to that job into one or more translated operations configured to execute that job on an available engine in the one or more available engines;

storing, by at least one of the one or more computing devices executing the method, each set of candidate translations corresponding to each job in the job graph in a region of a job hypergraph, wherein the job hypergraph comprises a sequence of connected regions corresponding to the sequence of connected jobs in the job graph;

condensing, by at least one of the one or more computing devices executing the method, the job hypergraph into an alternative job graph by iteratively replacing each pair of connected regions with a merged region comprising a merged candidate translation, the merged candidate translation being generated by combining a pair of candidate translations in that pair of connected regions; and generating, by at least one of the one or more computing devices executing the method, the alternative implementation of the program by mapping each job in the alternative job graph to one or more corresponding operations, wherein the alternative implementation is configured to execute on at least one of the one or more available engines.

2. The method of claim 1, wherein translating each job in the job graph into a set of candidate translations corresponding to that job based at least in part on one or more available engines comprises:

searching a plurality of translators to identify one or more candidate translators configured to generate instructions corresponding to the job which are executable on at least one of the one or more available engines;

selecting at least one candidate translator in the one or more candidate translators based at least in part on one or more translator selection rules; and executing the selected at least one candidate translator to generate the set of candidate translations.

3. The method of claim 1, wherein translating each job in the job graph into a set of candidate translations corresponding to that job based at least in part on one or more available engines comprises:

generating one or more new translators using one or more portions of one or more translators in a plurality of translators, wherein the one or more new translators are configured to generate instructions corresponding to the job which are executable on at least one of the one or more available engines; and executing the one or more new translators to generate the set of candidate translations.

4. The method of claim 1, wherein condensing the job hypergraph into an alternative job graph by iteratively replacing each pair of connected regions with a merged region comprising a merged candidate translation generated by combining a pair of candidate translations in that pair of connected regions comprises:

selecting a pair of connected regions from a plurality of pairs of connected regions in the hypergraph based at least in part on one or more merge investigation rules.

5. The method of claim 1, wherein condensing the job hypergraph into an alternative job graph by iteratively replacing each pair of connected regions with a merged region comprising a merged candidate translation generated by combining a pair of candidate translations in that pair of connected regions comprises:

selecting a first candidate translation in a first region of a pair of connected regions in the job hypergraph and a second candidate translation in a second region of the pair of connected regions in the job hypergraph;

merging the first candidate translation in the first region with the second candidate translation in the second region to generate the merged candidate translation;

determining whether the merging of the first candidate translation in the first region with the second candidate translation in the second region to generate the merged candidate translation was successful; and replacing the pair of connected regions in the job hypergraph with a merged region comprising the merged candidate translation based at least in part on a determination that the merging of the first candidate translation in the first region with the second candidate translation in the second region to generate the merged candidate translation was successful, wherein any other regions in the job hypergraph that were previously connected to the pair of regions are connected to the merged region.

6. The method of claim 5, wherein condensing the job hypergraph into an alternative job graph by iteratively replacing each pair of connected regions with a merged region comprising a merged candidate translation generated by combining a pair of candidate translations in that pair of connected regions further comprises:

reversing the merge of the first candidate translation in the first region with the second candidate translation in the second region based at least in part on a determination that the merging of the first candidate translation in the first region with the second candidate translation in the second region was not successful;

setting a flag indicating that the first candidate translation in the first region and the second candidate translation in the second region cannot be merged.

7. The method of claim 5, wherein merging the first candidate translation in the first region with the second candidate translation in the second region to generate the merged candidate translation comprises:

searching a plurality of merge functions based on one or more first characteristics corresponding to one or more first candidate translations in the first region and one or more second characteristics corresponding to one or more second candidate translations in the second region to identify one or more candidate merge functions configured to generate instructions corresponding to a combination of the one or more first candidate translations and the one or more second candidate translations;

selecting a candidate merge function in the one or more candidate merge functions based at least in part on one or more merge selection rules; and executing the selected candidate merge function to generate the merged candidate translation.

8. The method of claim 5, wherein merging the first candidate translation in the first region with the second candidate translation in the second region to generate the merged candidate translation comprises:

generating a new merge function using one or more portions of one or more merge functions in the plurality of merge functions, wherein the new merge function is configured to generate instructions corresponding to a combination of one of the one or more first candidate translations and one of the one or more second candidate translations; and executing the new merge function to generate the merged candidate translation.

9. The method of claim 1, wherein condensing the job hypergraph into an alternative job graph by iteratively replacing each pair of connected regions with a merged region comprising a merged candidate translation generated by combining a pair of candidate translations in that pair of connected regions comprises:

determining whether the job hypergraph has any remaining pairs of connected regions;

determining whether at least one region in the job hypergraph comprises more than one candidate translation based at least in part on a determination that the job hypergraph does not have any remaining pairs of connected regions;

designating the job hypergraph as the alternative job graph based at least in part on a determination that the job hypergraph does not have any remaining pairs of connected regions and a determination that no regions in the job hypergraph comprise more than one candidate translation.

10. The method of claim 1, wherein condensing the job hypergraph into an alternative job graph by iteratively replacing each pair of connected regions with a merged region comprising a merged candidate translation generated by combining a pair of candidate translations in that pair of connected regions comprises:

determining whether a current version of the job hypergraph meets one or more criteria;

reversing a previous replacement of a previous pair of connected regions with a merged region comprising a merged candidate translation generated by combining a previous pair of candidate translations in the previous pair of connected regions based at least in part on a determination that the current version of the job hypergraph does not meet the one or more criteria; and setting a flag indicating that the previous pair of candidate translations in the previous pair of connected regions cannot be merged.

11. The method of claim 1, wherein the one or more available engines comprise a plurality of available engines and wherein the alternative implementation is configured to execute on at least two of the plurality of available engines.

12. An apparatus for generating an alternative implementation of a program on one or more engines, the apparatus comprising:

one or more processors; and one or more memories operatively coupled to at least one of the one or more processors and having instructions stored thereon that, when executed by at least one of the one or more processors, cause at least one of the one or more processors executing the instructions to:

receive a job graph comprising a sequence of connected jobs corresponding to an implementation of the program, each job corresponding to one or more operations in the program;

translate each job in the job graph into a set of candidate translations corresponding to that job based at least in part on one or more available engines, wherein each available engine comprises an available execution environment for that job and wherein each candidate translation comprises a translation of the one or more operations corresponding to that job into one or more translated operations configured to execute that job on an available engine in the one or more available engines;

store each set of candidate translations corresponding to each job in the job graph in a region of a job hypergraph, wherein the job hypergraph comprises a sequence of connected regions corresponding to the sequence of connected jobs in the job graph;

condense the job hypergraph into an alternative job graph by iteratively replacing each pair of connected regions with a merged region comprising a merged candidate translation, the merged candidate translation being generated by combining a pair of candidate translations in that pair of connected regions; and generate the alternative implementation of the program by mapping each job in the alternative job graph to one or more corresponding operations, wherein the alternative implementation is configured to execute on at least one of the one or more available engines.

13. The apparatus of claim 12, wherein the instructions that, when executed by at least one of the one or more processors, cause at least one of the one or more processors to translate each job in the job graph into a set of candidate translations corresponding to that job based at least in part on one or more available engines further cause at least one of the one or more processors to:

search a plurality of translators to identify one or more candidate translators configured to generate instructions corresponding to the job which are executable on at least one of the one or more available engines;

select at least one candidate translator in the one or more candidate translators based at least in part on one or more translator selection rules; and execute the selected at least one candidate translator to generate the set of candidate translations.

14. The apparatus of claim 12, wherein the instructions that, when executed by at least one of the one or more processors, cause at least one of the one or more processors to translate each job in the job graph into a set of candidate translations corresponding to that job based at least in part on one or more available engines further cause at least one of the one or more processors to:

generate one or more new translators using one or more portions of one or more translators in a plurality of translators, wherein the one or more new translators are configured to generate instructions corresponding to the job which are executable on at least one of the one or more available engines; and execute the one or more new translators to generate the set of candidate translations.

15. The apparatus of claim 12, wherein the instructions that, when executed by at least one of the one or more processors, cause at least one of the one or more processors to condense the job hypergraph into an alternative job graph by iteratively replacing each pair of connected regions with a merged region comprising a merged candidate translation generated by combining a pair of candidate translations in that pair of connected regions further cause at least one of the one or more processors to:
select a pair of connected regions from a plurality of pairs of connected regions in the hypergraph based at least in part on one or more merge investigation rules.

16. The apparatus of claim 12, wherein the instructions that, when executed by at least one of the one or more processors, cause at least one of the one or more processors to condense the job hypergraph into an alternative job graph by iteratively replacing each pair of connected regions with a merged region comprising a merged candidate translation generated by combining a pair of candidate translations in that pair of connected regions further cause at least one of the one or more processors to:
select a first candidate translation in a first region of a pair of connected regions in the job hypergraph and a second candidate translation in a second region of the pair of connected regions in the job hypergraph;
merge the first candidate translation in the first region with the second candidate translation in the second region to generate the merged candidate translation;
determine whether the merging of the first candidate translation in the first region with the second candidate translation in the second region to generate the merged candidate translation was successful; and
replace the pair of connected regions in the job hypergraph with a merged region comprising the merged candidate translation based at least in part on a determination that the merging of the first candidate translation in the first region with the second candidate translation in the second region to generate the merged candidate translation was successful, wherein any other regions in the job hypergraph that were previously connected to the pair of regions are connected to the merged region.

17. The apparatus of claim 16, wherein the instructions that, when executed by at least one of the one or more processors, cause at least one of the one or more processors to condense the job hypergraph into an alternative job graph by iteratively replacing each pair of connected regions with a merged region comprising a merged candidate translation generated by combining a pair of candidate translations in that pair of connected regions further cause at least one of the one or more processors to:
reverse the merge of the first candidate translation in the first region with the second candidate translation in the second region based at least in part on a determination that the merging of the first candidate translation in the first region with the second candidate translation in the second region was not successful;
set a flag indicating that the first candidate translation in the first region and the second candidate translation in the second region cannot be merged.

18. The apparatus of claim 16, wherein the instructions that, when executed by at least one of the one or more processors, cause at least one of the one or more processors to merge the first candidate translation in the first region with the second candidate translation in the second region to generate the merged candidate translation further cause at least one of the one or more processors to:
search a plurality of merge functions based on one or more first characteristics corresponding to one or more first candidate translations in the first region and one or more second characteristics corresponding to one or more second candidate translations in the second region to identify one or more candidate merge functions configured to generate instructions corresponding to a combination of the one or more first candidate translations and the one or more second candidate translations;
select a candidate merge function in the one or more candidate merge functions based at least in part on one or more merge selection rules; and
execute the selected candidate merge function to generate the merged candidate translation.

19. The apparatus of claim 16, wherein the instructions that, when executed by at least one of the one or more processors, cause at least one of the one or more processors to merge the first candidate translation in the first region with the second candidate translation in the second region to generate the merged candidate translation further cause at least one of the one or more processors to:
generate a new merge function using one or more portions of one or more merge functions in the plurality of merge functions, wherein the new merge function is configured to generate instructions corresponding to a combination of one of the one or more first candidate translations and one of the one or more second candidate translations; and
execute the new merge function to generate the merged candidate translation.

20. The apparatus of claim 12, wherein the instructions that, when executed by at least one of the one or more processors, cause at least one of the one or more processors to condense the job hypergraph into an alternative job graph by iteratively replacing each pair of connected regions with a merged region comprising a merged candidate translation generated by combining a pair of candidate translations in that pair of connected regions further cause at least one of the one or more processors to:
determine whether the job hypergraph has any remaining pairs of connected regions;
determine whether at least one region in the job hypergraph comprises more than one candidate translation based at least in part on a determination that the job hypergraph does not have any remaining pairs of connected regions;
designate the job hypergraph as the alternative job graph based at least in part on a determination that the job hypergraph does not have any remaining pairs of connected regions and a determination that no regions in the job hypergraph comprise more than one candidate translation.

21. The apparatus of claim 12, wherein the instructions that, when executed by at least one of the one or more processors, cause at least one of the one or more processors to condense the job hypergraph into an alternative job graph by iteratively replacing each pair of connected regions with a merged region comprising a merged candidate translation generated by combining a pair of candidate translations in that pair of connected regions further cause at least one of the one or more processors to:
determine whether a current version of the job hypergraph meets one or more criteria;
reverse a previous replacement of a previous pair of connected regions with a merged region comprising a merged candidate translation generated by combining a previous pair of candidate translations in the previous pair of connected regions based at least in part on a determination that the current version of the job hypergraph does not meet the one or more criteria; and set a flag indicating that the previous pair of candidate translations in the previous pair of connected regions cannot be merged.

22. The apparatus of claim 12, wherein the one or more available engines comprise a plurality of available engines and wherein the alternative implementation is configured to execute on at least two of the plurality of available engines.

23. At least one non-transitory computer-readable medium storing computer-readable instructions that, when executed by one or more computing devices, cause at least one of the one or more computing devices executing the computer-readable instructions to:

receive a job graph comprising a sequence of connected jobs corresponding to an implementation of the program, each job corresponding to one or more operations in the program;

translate each job in the job graph into a set of candidate translations corresponding to that job based at least in part on one or more available engines, wherein each available engine comprises an available execution environment for that job and wherein each candidate translation comprises a translation of the one or more operations corresponding to that job into one or more translated operations configured to execute that job on an available engine in the one or more available engines;

store each set of candidate translations corresponding to each job in the job graph in a region of a job hypergraph, wherein the job hypergraph comprises a sequence of connected regions corresponding to the sequence of connected jobs in the job graph;

condense the job hypergraph into an alternative job graph by iteratively replacing each pair of connected regions with a merged region comprising a merged candidate translation, the merged candidate translation being generated by combining a pair of candidate translations in that pair of connected regions; and generate the alternative implementation of the program by mapping each job in the alternative job graph to one or more corresponding operations, wherein the alternative implementation is configured to execute on at least one of the one or more available engines.

24. The apparatus of claim 23, wherein the instructions that, when executed by at least one of the one or more computing devices, cause at least one of the one or more computing devices to translate each job in the job graph into a set of candidate translations corresponding to that job based at least in part on one or more available engines further cause at least one of the one or more computing devices to:

search a plurality of translators to identify one or more candidate translators configured to generate instructions corresponding to the job which are executable on at least one of the one or more available engines;

select at least one candidate translator in the one or more candidate translators based at least in part on one or more translator selection rules; and execute the selected at least one candidate translator to generate the set of candidate translations.

25. The apparatus of claim 23, wherein the instructions that, when executed by at least one of the one or more computing devices, cause at least one of the one or more computing devices to translate each job in the job graph into a set of candidate translations corresponding to that job based at least in part on one or more available engines further cause at least one of the one or more computing devices to:

generate one or more new translators using one or more portions of one or more translators in a plurality of translators, wherein the one or more new translators are configured to generate instructions corresponding to the job which are executable on at least one of the one or more available engines; and execute the one or more new translators to generate the set of candidate translations.

26. The apparatus of claim 23, wherein the instructions that, when executed by at least one of the one or more computing devices, cause at least one of the one or more computing devices to condense the job hypergraph into an alternative job graph by iteratively replacing each pair of connected regions with a merged region comprising a merged candidate translation generated by combining a pair of candidate translations in that pair of connected regions further cause at least one of the one or more computing devices to:

select a pair of connected regions from a plurality of pairs of connected regions in the hypergraph based at least in part on one or more merge investigation rules.

27. The apparatus of claim 23, wherein the instructions that, when executed by at least one of the one or more computing devices, cause at least one of the one or more computing devices to condense the job hypergraph into an alternative job graph by iteratively replacing each pair of connected regions with a merged region comprising a merged candidate translation generated by combining a pair of candidate translations in that pair of connected regions further cause at least one of the one or more computing devices to:

select a first candidate translation in a first region of a pair of connected regions in the job hypergraph and a second candidate translation in a second region of the pair of connected regions in the job hypergraph;

merge the first candidate translation in the first region with the second candidate translation in the second region to generate the merged candidate translation;

determine whether the merging of the first candidate translation in the first region with the second candidate translation in the second region to generate the merged candidate translation was successful; and replace the pair of connected regions in the job hypergraph with a merged region comprising the merged candidate translation based at least in part on a determination that the merging of the first candidate translation in the first region with the second candidate translation in the second region to generate the merged candidate translation was successful, wherein any other regions in the job hypergraph that were previously connected to the pair of regions are connected to the merged region.

28. The apparatus of claim 27, wherein the instructions that, when executed by at least one of the one or more computing devices, cause at least one of the one or more computing devices to condense the job hypergraph into an alternative job graph by iteratively replacing each pair of connected regions with a merged region comprising a merged candidate translation generated by combining a pair of candidate translations in that pair of connected regions further cause at least one of the one or more computing devices to:

reverse the merge of the first candidate translation in the first region with the second candidate translation in the second region based at least in part on a determination that the merging of the first candidate translation in the first region with the second candidate translation in the second region was not successful;

set a flag indicating that the first candidate translation in the first region and the second candidate translation in the second region cannot be merged.

29. The apparatus of claim 27, wherein the instructions that, when executed by at least one of the one or more computing devices, cause at least one of the one or more computing devices to merge the first candidate translation in the first region with the second candidate translation in the second region to generate the merged candidate translation further cause at least one of the one or more computing devices to:

search a plurality of merge functions based on one or more first characteristics corresponding to one or more first candidate translations in the first region and one or more second characteristics corresponding to one or more second candidate translations in the second region to identify one or more candidate merge functions configured to generate instructions corresponding to a combination of the one or more first candidate translations and the one or more second candidate translations;

select a candidate merge function in the one or more candidate merge functions based at least in part on one or more merge selection rules; and execute the selected candidate merge function to generate the merged candidate translation.

30. The apparatus of claim 27, wherein the instructions that, when executed by at least one of the one or more computing devices, cause at least one of the one or more computing devices to merge the first candidate translation in the first region with the second candidate translation in the second region to generate the merged candidate translation further cause at least one of the one or more computing devices to:

generate a new merge function using one or more portions of one or more merge functions in the plurality of merge functions, wherein the new merge function is configured to generate instructions corresponding to a combination of one of the one or more first candidate translations and one of the one or more second candidate translations; and execute the new merge function to generate the merged candidate translation.

31. The apparatus of claim 23, wherein the instructions that, when executed by at least one of the one or more computing devices, cause at least one of the one or more computing devices to condense the job hypergraph into an alternative job graph by iteratively replacing each pair of connected regions with a merged region comprising a merged candidate translation generated by combining a pair of candidate translations in that pair of connected regions further cause at least one of the one or more computing devices to:

determine whether the job hypergraph has any remaining pairs of connected regions;

determine whether at least one region in the job hypergraph comprises more than one candidate translation based at least in part on a determination that the job hypergraph does not have any remaining pairs of connected regions;

designate the job hypergraph as the alternative job graph based at least in part on a determination that the job hypergraph does not have any remaining pairs of connected regions and a determination that no regions in the job hypergraph comprise more than one candidate translation.

32. The apparatus of claim 23, wherein the instructions that, when executed by at least one of the one or more computing devices, cause at least one of the one or more computing devices to condense the job hypergraph into an alternative job graph by iteratively replacing each pair of connected regions with a merged region comprising a merged candidate translation generated by combining a pair of candidate translations in that pair of connected regions further cause at least one of the one or more computing devices to:

determine whether a current version of the job hypergraph meets one or more criteria;

reverse a previous replacement of a previous pair of connected regions with a merged region comprising a merged candidate translation generated by combining a previous pair of candidate translations in the previous pair of connected regions based at least in part on a determination that the current version of the job hypergraph does not meet the one or more criteria; and set a flag indicating that the previous pair of candidate translations in the previous pair of connected regions cannot be merged.

33. The apparatus of claim 23, wherein the one or more available engines comprise a plurality of available engines and wherein the alternative implementation is configured to execute on at least two of the plurality of available engines.

* * * * *

UNITED STATES PATENT AND TRADEMARK OFFICE
CERTIFICATE OF CORRECTION

PATENT NO.         : 10,360,002 B2
APPLICATION NO.    : 15/615264
DATED              : July 23, 2019
INVENTOR(S)        : Guy Ryan Boo Page 1 of 1

It is certified that error appears in the above-identified patent and that said Letters Patent is hereby corrected as shown below:

In the Specification

On Column 21, Line 23, please replace the sentence as follows:
But in this case the SQL fits into just one query, so the smart driver decides to treat it as the SQL override for a relational source, resulting in the merger shown in Fig. 17C.

On Column 24, Line 61, please replace the sentence as follows:
A more significant advantage of the Flex framework is that it is a common platform which allows for simultaneous comparison of candidate executions, even if the candidates span across different engines.

Signed and Sealed this
Twelfth Day of November, 2019

Andrei Iancu
*Director of the United States Patent and Trademark Office*